United States Patent
Choi et al.

(10) Patent No.: US 12,478,894 B2
(45) Date of Patent: Nov. 25, 2025

(54) METHOD AND DEVICE FOR DIRECTING LIGHTING EFFECT THAT INDUCES DYNAMIC EFFECT OF DIRECTION OBJECT BY USING MASKING LAYER

(71) Applicant: FANLIGHT CO., LTD., Seoul (KR)

(72) Inventors: Kyung Il Choi, Seoul (KR); Jung Min Choi, Seoul (KR); Hyun Gil Kim, Seoul (KR)

(73) Assignee: FANLIGHT CO., LTD., Seoul (KR)

( * ) Notice: Subject to any disclaimer, the term of this patent is extended or adjusted under 35 U.S.C. 154(b) by 470 days.

(21) Appl. No.: 18/172,808

(22) Filed: Feb. 22, 2023

(65) Prior Publication Data

US 2023/0201738 A1 Jun. 29, 2023

Related U.S. Application Data

(63) Continuation of application No. PCT/KR2022/012961, filed on Aug. 30, 2022.

(30) Foreign Application Priority Data

Sep. 14, 2021 (KR) .................. 10-2021-0122384

(51) Int. Cl.
*A63J 5/02* (2006.01)
*H05B 47/155* (2020.01)
(Continued)

(52) U.S. Cl.
CPC .............. *A63J 5/02* (2013.01); *H05B 47/155* (2020.01); *H05B 47/165* (2020.01); *H05B 47/175* (2020.01)

(58) Field of Classification Search
CPC ....... A63J 5/02; H05B 47/175; H05B 47/155; H05B 47/165
(Continued)

(56) References Cited

U.S. PATENT DOCUMENTS 9,345,114 B2    5/2016   Kim et al.
9,578,714 B2    2/2017   Kim et al.
(Continued)

FOREIGN PATENT DOCUMENTS

KR   10-2015-0055938 A    5/2015
KR   10-2016-0015032 A    2/2016
(Continued)

OTHER PUBLICATIONS

International Search Report issued in PCT/KR2022/012961; mailed Nov. 25, 2022.
(Continued)

*Primary Examiner* — Laura K Tso
(74) *Attorney, Agent, or Firm* — Studebaker Brackett PLLC

(57) ABSTRACT

Disclosed is a method and device for directing a lighting effect that induces dynamic effects by using a masking layer. The method and device for directing a lighting effect may selectively control emission of a plurality of light emitting devices based on a masking layer, thereby inducing dynamic imaging effects such as moving images in a direction object, and may achieve the direction having a high degree of freedom by directing the direction position, size, or rotation of an object during a performance direction in a performance hall.

15 Claims, 24 Drawing Sheets

(51) Int. Cl.
*H05B 47/165* (2020.01)
*H05B 47/175* (2020.01)

(58) Field of Classification Search
USPC .......................................................... 472/61
See application file for complete search history.

(56) References Cited

U.S. PATENT DOCUMENTS

| | | | |
|---|---|---|---|
| 11,330,693 B2* | 5/2022 | Hultermans | ......... H05B 47/115 |
| 2015/0130365 A1 | 5/2015 | Kim et al. | |
| 2016/0242256 A1 | 8/2016 | Kim et al. | |

FOREIGN PATENT DOCUMENTS

| | | | |
|---|---|---|---|
| KR | 10-2020-0068637 A | 6/2020 | |
| KR | 10-2021-0119341 A | 10/2021 | |

OTHER PUBLICATIONS

Ei-Nasr et al; Digitalbeing: an Ambient Intelligent Dance Space; 2006 IEEE International Conference On Fuzzy Systems; Vancouver, BC, Canada; Jul. 16-21, 2006; p. 907-914.

* cited by examiner

FIG. 5

MASKING MAP

Masking Layer9      Masking LayerA

FIG. 6

| Object number | 1 | 2 | 3 | 4 | 5 | 6 | 7 | 8 | 9 | 10(A) | 11(B) | 12(C) | 13(D) | 14(E) | 15(F) | 16(G) |
|---|---|---|---|---|---|---|---|---|---|---|---|---|---|---|---|---|
| Activation | O | O | O | O | X | O | X | X | O | X | X | O | X | X | O | X |
| Beat representation | 1 | 1 | 1 | 1 | 0 | 1 | 0 | 0 | 1 | 0 | 0 | 1 | 0 | 0 | 1 | 0 |
| Beat representation | 0b11110100 | | | | | | | | 0b10010010 | | | | | | | |
| Byte representation | 0xF4 | | | | | | | | 0x92 | | | | | | | |

FIG. 7

| Object number | 1 | 2 | 3 | 4 | 5 | 6 | 7 | 8 | 9 | 10(A) | 11(B) | 12(C) | 13(D) | 14(E) | 15(F) | 16(G) |
|---|---|---|---|---|---|---|---|---|---|---|---|---|---|---|---|---|
| Activation | O | O | X | X | X | X | X | X | X | X | X | X | X | X | X | X |
| Beat representation | 1 | 1 | 0 | 0 | 0 | 0 | 0 | 0 | 0 | 0 | 0 | 0 | 0 | 0 | 0 | 0 |
| Beat representation | 0b11000000 | | | | | | | | 0b00000000 | | | | | | | |
| Byte representation | 0xC0 | | | | | | | | 0x00 | | | | | | | |

FIG. 9

| | Object Information | | | | | Mask Information | | | | |
|---|---|---|---|---|---|---|---|---|---|---|
| | Object number | Activation | | Reference coordinates | | Object number | Activation | | Reference coordinates | |
| Hexadecimal number | 0x01 | 0xF4 | 0x92 | 0x0A | 0x0A | 0x02 | 0xC0 | 0x00 | 0x0A | 0x0A |
| Decimal number | 1 | 244 | 146 | 10 | 10 | 2 | 192 | 0 | 10 | 10 |
| Number of data | 1 | 2 | 3 | 4 | 5 | 6 | 7 | 8 | 9 | 10 |

Color Information

| | Activation 1 | Activation 2 | Activation 3 | Activation 4 | Activation 5 | Activation 6 | Activation 7 | Activation 8 | Activation 9 | Activation 10 | Activation 11 | Activation 12 | Activation 13 | Activation 14 | Activation 15 | Activation 16 |
|---|---|---|---|---|---|---|---|---|---|---|---|---|---|---|---|---|
| Hexadecimal number | Yellow | Brown | Green | Blue | Don't Care | Yellow | Don't Care | Don't Care | Brown | Don't Care | Don't Care | Green | Don't Care | Don't Care | Blue | Don't Care |
| Decimal number | | | | | | | | | | | | | | | | |
| Number of data | 11 | 12 | 13 | 14 | 15 | 16 | 17 | 18 | 19 | 20 | 21 | 22 | 23 | 24 | 25 | 26 |

Packet 1a

SCENE1

SCENE2e

FIG. 20

| | Object Information | | | | | Mask Information | | | | | Object magnification | Object rotation |
|---|---|---|---|---|---|---|---|---|---|---|---|---|
| | Object number | Activation | | Reference coordinates | | Mask number | Activation | | Reference coordinates | | | |
| Hexadecimal number | 0x01 | 0xF4 | 0x92 | 0x0A | 0x0A | 0x02 | 0xC0 | 0x00 | 0x0A | 0x0A | 0~255 | 0~255 |
| Decimal number | 1 | 244 | 146 | 10 | 10 | 2 | 192 | 0 | 10 | 10 | | |
| Number of data | 1 | 2 | 3 | 4 | 5 | 6 | 7 | 8 | 9 | 10 | 11 | 12 |

| | Activation 1 | Activation 2 | Activation 3 | Activation 4 | Activation 5 | Activation 6 | Activation 7 | Activation 8 | Activation 9 | Activation 10 | Activation 11 | Activation 12 | Activation 13 | Activation 14 | Activation 15 | Activation 16 |
|---|---|---|---|---|---|---|---|---|---|---|---|---|---|---|---|---|
| Hexadecimal number | Yellow | Brown | Green | Blue | Don't Care | Yellow | Don't Care | Don't Care | Brown | Don't Care | Don't Care | Don't Care | Don't Care | Don't Care | Blue | Don't Care |
| Decimal number | 13 | 14 | 15 | 16 | 17 | 18 | 19 | 20 | 21 | 22 | 23 | 24 | 25 | 26 | 27 | 28 |

Color Information

Packet3a

FIG. 21

| Indication value | Angle (Deg) | Sin value | Indication value | Angle (Deg) | Sin value | Indication value | Angle (Deg) | Sin value | Indication value | Angle (Deg) | Sin value | Indication value | Angle (Deg) | Sin value | Indication value | Angle (Deg) | Sin value |
|---|---|---|---|---|---|---|---|---|---|---|---|---|---|---|---|---|---|
| 0 | 0 | 0.000 | 30 | 45 | 0.707 | 60 | 90 | 1.000 | 90 | 135 | 0.707 | 120 | 180 | 0.000 | 150 | 225 | -0.707 |
| 1 | 1.5 | 0.026 | 31 | 46.5 | 0.725 | 61 | 91.5 | 1.000 | 91 | 136.5 | 0.688 | 121 | 181.5 | -0.026 | 151 | 226.5 | -0.725 |
| 2 | 3 | 0.052 | 32 | 48 | 0.743 | 62 | 93 | 0.999 | 92 | 138 | 0.669 | 122 | 183 | -0.052 | 152 | 228 | -0.743 |
| 3 | 4.5 | 0.078 | 33 | 49.5 | 0.760 | 63 | 94.5 | 0.997 | 93 | 139.5 | 0.649 | 123 | 184.5 | -0.078 | 153 | 229.5 | -0.76 |
| 4 | 6 | 0.105 | 34 | 51 | 0.777 | 64 | 96 | 0.995 | 94 | 141 | 0.629 | 124 | 186 | -0.105 | 154 | 231 | -0.777 |
| 5 | 7.5 | 0.131 | 35 | 52.5 | 0.793 | 65 | 97.5 | 0.991 | 95 | 142.5 | 0.609 | 125 | 187.5 | -0.131 | 155 | 232.5 | -0.793 |
| 6 | 9 | 0.156 | 36 | 54 | 0.809 | 66 | 99 | 0.988 | 96 | 144 | 0.588 | 126 | 189 | -0.156 | 156 | 234 | -0.809 |
| 7 | 10.5 | 0.182 | 37 | 55.5 | 0.824 | 67 | 100.5 | 0.983 | 97 | 145.5 | 0.566 | 127 | 190.5 | -0.182 | 157 | 235.5 | -0.824 |
| 8 | 12 | 0.208 | 38 | 57 | 0.839 | 68 | 102 | 0.978 | 98 | 147 | 0.545 | 128 | 192 | -0.208 | 158 | 237 | -0.839 |
| 9 | 13.5 | 0.233 | 39 | 58.5 | 0.853 | 69 | 103.5 | 0.972 | 99 | 148.5 | 0.522 | 129 | 193.5 | -0.233 | 159 | 238.5 | -0.853 |
| 10 | 15 | 0.259 | 40 | 60 | 0.866 | 70 | 105 | 0.966 | 100 | 150 | 0.500 | 130 | 195 | -0.259 | 160 | 240 | -0.866 |
| 11 | 16.5 | 0.284 | 41 | 61.5 | 0.879 | 71 | 106.5 | 0.959 | 101 | 151.5 | 0.477 | 131 | 196.5 | -0.284 | 161 | 241.5 | -0.879 |
| 12 | 18 | 0.309 | 42 | 63 | 0.891 | 72 | 108 | 0.951 | 102 | 153 | 0.454 | 132 | 198 | -0.309 | 162 | 243 | -0.891 |
| 13 | 19.5 | 0.334 | 43 | 64.5 | 0.903 | 73 | 109.5 | 0.943 | 103 | 154.5 | 0.431 | 133 | 199.5 | -0.334 | 163 | 244.5 | -0.903 |
| 14 | 21 | 0.358 | 44 | 66 | 0.914 | 74 | 111 | 0.934 | 104 | 156 | 0.407 | 134 | 201 | -0.358 | 164 | 246 | -0.914 |
| 15 | 22.5 | 0.383 | 45 | 67.5 | 0.924 | 75 | 112.5 | 0.924 | 105 | 157.5 | 0.383 | 135 | 202.5 | -0.383 | 165 | 247.5 | -0.924 |
| 16 | 24 | 0.407 | 46 | 69 | 0.934 | 76 | 114 | 0.914 | 106 | 159 | 0.358 | 136 | 204 | -0.407 | 166 | 249 | -0.934 |
| 17 | 25.5 | 0.431 | 47 | 70.5 | 0.943 | 77 | 115.5 | 0.903 | 107 | 160.5 | 0.334 | 137 | 205.5 | -0.431 | 167 | 250.5 | -0.943 |
| 18 | 27 | 0.454 | 48 | 72 | 0.951 | 78 | 117 | 0.891 | 108 | 162 | 0.309 | 138 | 207 | -0.454 | 168 | 252 | -0.951 |
| 19 | 28.5 | 0.477 | 49 | 73.5 | 0.959 | 79 | 118.5 | 0.879 | 109 | 163.5 | 0.284 | 139 | 208.5 | -0.477 | 169 | 253.5 | -0.959 |
| 20 | 30 | 0.500 | 50 | 75 | 0.966 | 80 | 120 | 0.866 | 110 | 165 | 0.259 | 140 | 210 | -0.500 | 170 | 255 | -0.966 |
| 21 | 31.5 | 0.522 | 51 | 76.5 | 0.972 | 81 | 121.5 | 0.853 | 111 | 166.5 | 0.233 | 141 | 211.5 | -0.522 | 171 | 256.5 | -0.972 |
| 22 | 33 | 0.545 | 52 | 78 | 0.978 | 82 | 123 | 0.839 | 112 | 168 | 0.208 | 142 | 213 | -0.545 | 172 | 258 | -0.978 |
| 23 | 34.5 | 0.566 | 53 | 79.5 | 0.983 | 83 | 124.5 | 0.824 | 113 | 169.5 | 0.182 | 143 | 214.5 | -0.566 | 173 | 259.5 | -0.983 |
| 24 | 36 | 0.588 | 54 | 81 | 0.988 | 84 | 126 | 0.809 | 114 | 171 | 0.156 | 144 | 216 | -0.588 | 174 | 261 | -0.988 |
| 25 | 37.5 | 0.609 | 55 | 82.5 | 0.991 | 85 | 127.5 | 0.793 | 115 | 172.5 | 0.131 | 145 | 217.5 | -0.609 | 175 | 262.5 | -0.991 |
| 26 | 39 | 0.629 | 56 | 84 | 0.995 | 86 | 129 | 0.777 | 116 | 174 | 0.105 | 146 | 219 | -0.629 | 176 | 264 | -0.995 |
| 27 | 40.5 | 0.649 | 57 | 85.5 | 0.997 | 87 | 130.5 | 0.760 | 117 | 175.5 | 0.078 | 147 | 220.5 | -0.649 | 177 | 265.5 | -0.997 |
| 28 | 42 | 0.669 | 58 | 87 | 0.999 | 88 | 132 | 0.743 | 118 | 177 | 0.052 | 148 | 222 | -0.669 | 178 | 267 | -0.999 |
| 29 | 43.5 | 0.688 | 59 | 88.5 | 1.000 | 89 | 133.5 | 0.725 | 119 | 178.5 | 0.026 | 149 | 223.5 | -0.688 | 179 | 268.5 | -1.000 |
| 180 | 270 | -1.000 | 210 | 315 | -0.707 | | | | | | | | | | | | |
| 181 | 271.5 | -1.000 | 211 | 316.5 | -0.688 | | | | | | | | | | | | |
| 182 | 273 | -0.999 | 212 | 318 | -0.669 | | | | | | | | | | | | |
| 183 | 274.5 | -0.997 | 213 | 319.5 | -0.649 | | | | | | | | | | | | |
| 184 | 276 | -0.995 | 214 | 321 | -0.629 | | | | | | | | | | | | |
| 185 | 277.5 | -0.991 | 215 | 322.5 | -0.609 | | | | | | | | | | | | |
| 186 | 279 | -0.988 | 216 | 324 | -0.588 | | | | | | | | | | | | |
| 187 | 280.5 | -0.983 | 217 | 325.5 | -0.566 | | | | | | | | | | | | |
| 188 | 282 | -0.978 | 218 | 327 | -0.545 | | | | | | | | | | | | |
| 189 | 283.5 | -0.972 | 219 | 328.5 | -0.522 | | | | | | | | | | | | |
| 190 | 285 | -0.966 | 220 | 330 | -0.500 | | | | | | | | | | | | |
| 191 | 286.5 | -0.959 | 221 | 331.5 | -0.477 | | | | | | | | | | | | |
| 192 | 288 | -0.951 | 222 | 333 | -0.454 | | | | | | | | | | | | |
| 193 | 289.5 | -0.943 | 223 | 334.5 | -0.431 | | | | | | | | | | | | |
| 194 | 291 | -0.934 | 224 | 336 | -0.407 | | | | | | | | | | | | |
| 195 | 292.5 | -0.924 | 225 | 337.5 | -0.383 | | | | | | | | | | | | |
| 196 | 294 | -0.914 | 226 | 339 | -0.358 | | | | | | | | | | | | |
| 197 | 295.5 | -0.903 | 227 | 340.5 | -0.334 | | | | | | | | | | | | |
| 198 | 297 | -0.891 | 228 | 342 | -0.309 | | | | | | | | | | | | |
| 199 | 298.5 | -0.879 | 229 | 343.5 | -0.284 | | | | | | | | | | | | |
| 200 | 300 | -0.866 | 230 | 345 | -0.259 | | | | | | | | | | | | |
| 201 | 301.5 | -0.853 | 231 | 346.5 | -0.233 | | | | | | | | | | | | |
| 202 | 303 | -0.839 | 232 | 348 | -0.208 | | | | | | | | | | | | |
| 203 | 304.5 | -0.824 | 233 | 349.5 | -0.182 | | | | | | | | | | | | |
| 204 | 306 | -0.809 | 234 | 351 | -0.156 | | | | | | | | | | | | |
| 205 | 307.5 | -0.793 | 235 | 352.5 | -0.131 | | | | | | | | | | | | |
| 206 | 309 | -0.777 | 236 | 354 | -0.105 | | | | | | | | | | | | |
| 207 | 310.5 | -0.76 | 237 | 355.5 | -0.078 | | | | | | | | | | | | |
| 208 | 312 | -0.743 | 238 | 357 | -0.052 | | | | | | | | | | | | |
| 209 | 313.5 | -0.725 | 239 | 358.5 | -0.026 | | | | | | | | | | | | |

FIG. 22
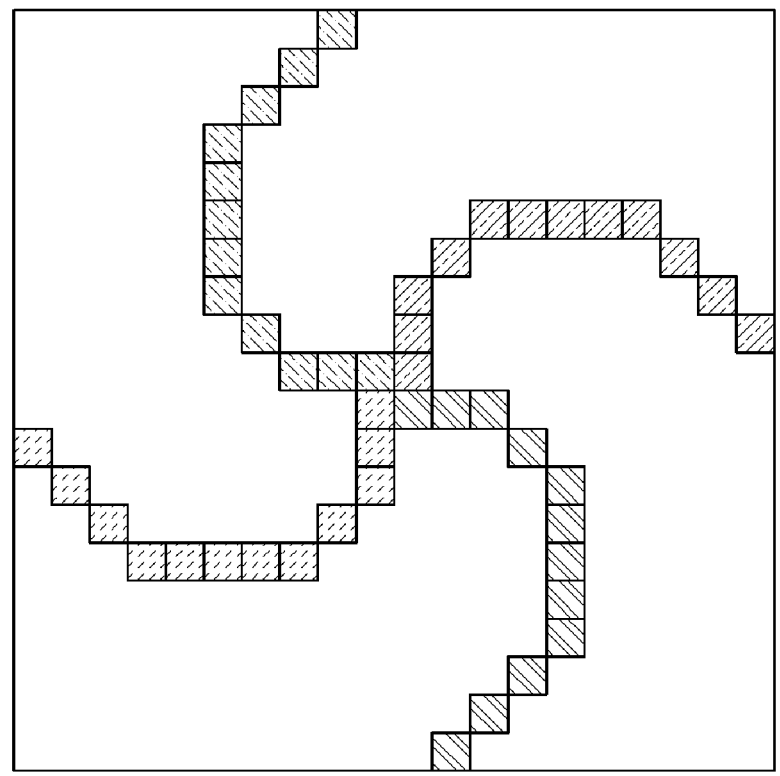
SCENE3 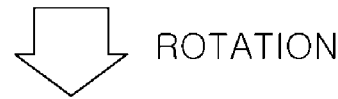 ROTATION
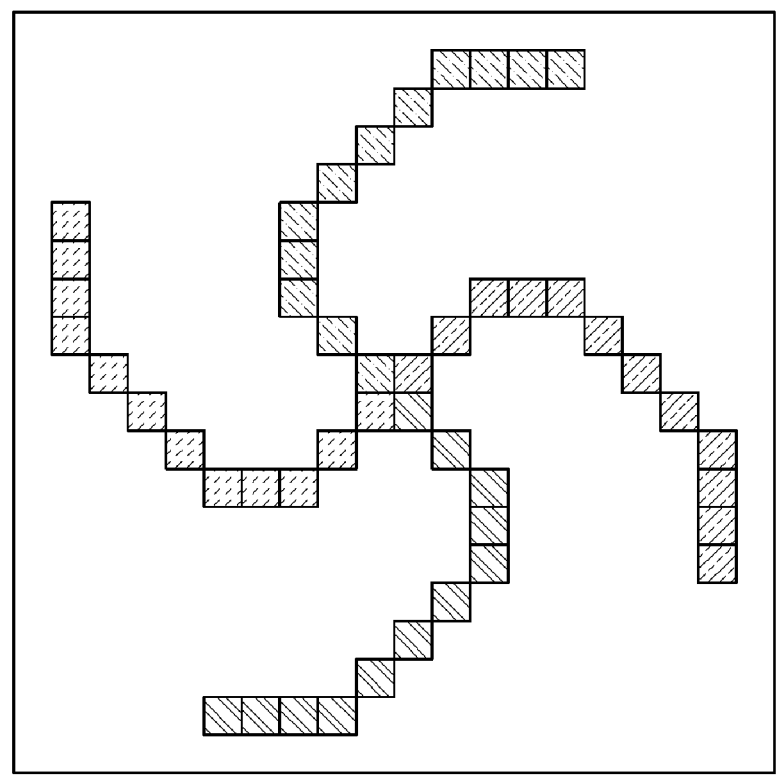

FIG. 23

| V | ... | 123 | 124 | 125 | 126 | 127 | 128 | 129 | 130 | 131 | 132 | ... |
|---|---|---|---|---|---|---|---|---|---|---|---|---|
| M | ... | 0.6 times | 0.7 times | 0.8 times | 0.9 times | 1 times Original size | 1.1 times | 1.2 times | 1.3 times | 1.4 times | 1.5 times | ... |

FIG. 24
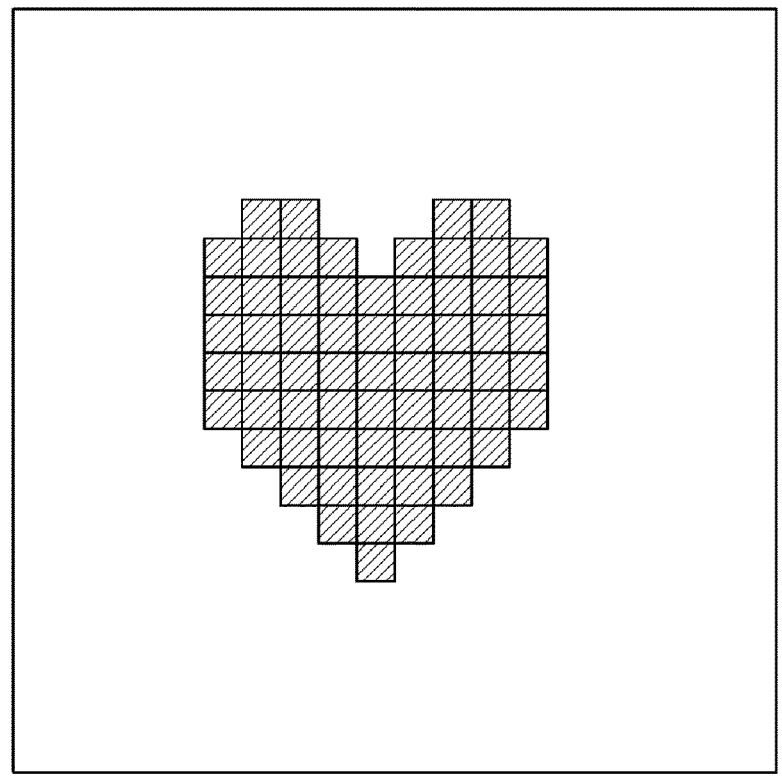
SCENE4 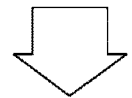 RESIZE
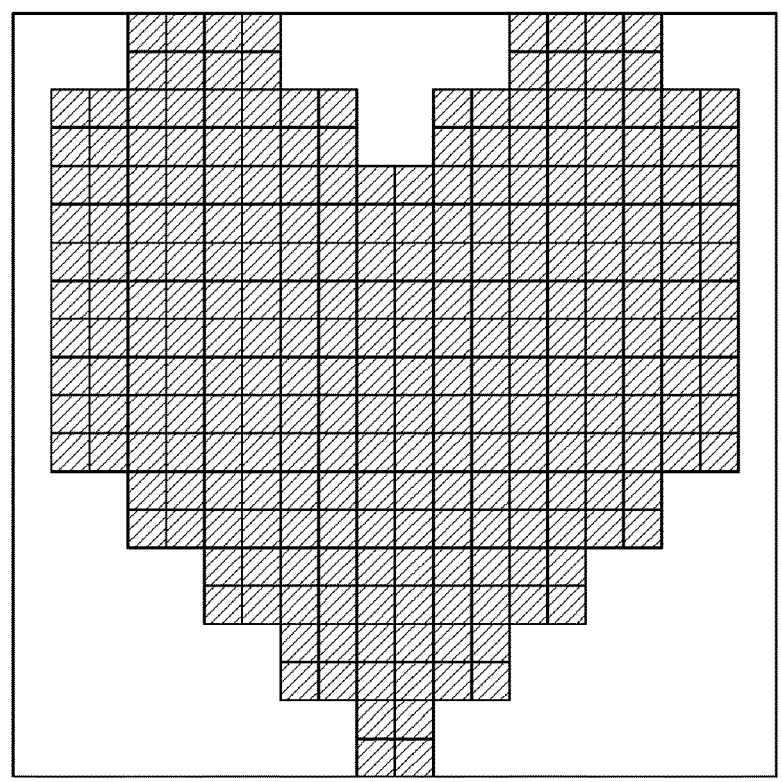

METHOD AND DEVICE FOR DIRECTING LIGHTING EFFECT THAT INDUCES DYNAMIC EFFECT OF DIRECTION OBJECT BY USING MASKING LAYER

CROSS-REFERENCE TO RELATED APPLICATIONS

The present application is a continuation of International Patent Application No. PCT/KR2022/012961, filed on Aug. 30, 2022, which is based upon and claims the benefit of priority to Korean Patent Application No. 10-2021-0122384 filed on Sep. 14, 2021. The disclosures of the above-listed applications are hereby incorporated by reference herein in their entirety.

BACKGROUND

Embodiments of the inventive concept described herein relate to a method and device for directing a lighting effect that induces dynamic effects such as a moving effect of a direction object by using a masking layer.

In general, a light emitting device (or a lighting device) refers to a device that achieves the purpose of lighting by reflecting, refracting, and transmitting light from a light source. The light emitting device may be classified into an indirect light emitting device, a semi-indirect light emitting device, a full-diffusion light emitting device, a semi-direct light emitting device, and a direct light emitting device based on light distribution.

With developments of technologies, the light emitting device is being used for various purposes. For example, the light emitting device may be used to direct a media facade that implements a media function by installing light emitting devices on an outer wall of a building. As another example, the light emitting device may be used as a portable cheering tool in a performance hall for a sports event or concert, which is an environment having illumination of a specific level or less. However, because a plurality of light emitting devices are individually controlled in such the performance environment, it is difficult to create a systematic lighting pattern or shape. In addition, it is difficult to achieve an effective cheering effect only by using a light source arranged in a light emitting device.

There may be the limitation of a usable wireless bandwidth (e.g., the data processing time of each light emitting device that occurs inevitably even when pieces of data are broadcast to a plurality of light emitting devices at the same time), as a cause of the problem difficult to be resolved.

Accordingly, to specifically solve the above-described problem, there is a need for a method capable of collectively controlling a plurality of light emitting devices and directing various performances in a performance hall such as a sports stadium or concert hall through this control.

SUMMARY

Embodiments of the inventive concept provide a method and device for directing a lighting effect that induces dynamic effects such as a moving effect of a direction object by using a masking layer.

Problems to be solved by the inventive concept are not limited to the problems mentioned above, and other problems not mentioned will be clearly understood by those skilled in the art from the following description.

According to an embodiment, a lighting effect directing method performed by a light emitting device of a lighting control system includes determining first coordinates of the light emitting device at a seat based on seat information thus received, receiving and storing a lighting map predefined to express a direction shape and a masking map predefined to cover at least part of the direction shape, receiving a control packet, which includes object information indicating at least one of a plurality of partial objects included in the lighting map, mask information indicating at least one of a plurality of masking layers included in the masking map, and color information indicating a light emission color, and which is broadcast, emitting light corresponding to the light emission color when it is determined based on the object information and the mask information that the light emitting device is included in the indicated partial object, and dynamically expressing the direction shape by omitting light emission when it is determined that the light emitting device is also doubly included in the indicated masking layer.

In accordance with the lighting effect directing method of the light emitting device according to an embodiment of the inventive concept, the object information may include an object number indicating one of a plurality of direction scenes, activation information of the plurality of partial objects included in a lighting map corresponding to an indicated object number, and coordinate information of a first reference origin of the lighting map.

In accordance with the lighting effect directing method of the light emitting device according to an embodiment of the inventive concept, an object origin of the lighting map may be a center of the direction shape, and the first coordinates may be relatively determined based on the first reference origin.

In accordance with the lighting effect directing method of the light emitting device according to an embodiment of the inventive concept, the mask information may include a mask number indicating one of a plurality of mask shapes, activation information of the plurality of masking layers included in a masking map corresponding to an indicated mask number, and coordinate information of a second reference origin of the masking map.

In accordance with the lighting effect directing method of the light emitting device according to an embodiment of the inventive concept, the lighting effect directing method may further include determining a first location relationship between a first reference origin of the lighting map and the first coordinates, based on the object information, and determining a second location relationship between a second reference origin of the masking map and the first coordinates, based on the mask information.

In accordance with the lighting effect directing method of the light emitting device according to an embodiment of the inventive concept, the determining of the second location relationship may include determining the at least one expression level based on a distance between the second reference origin and the first coordinates.

In accordance with the lighting effect directing method of the light emitting device according to an embodiment of the inventive concept, the light emitting device may be provided with a first table in which a calculation value required for rotation conversion is mapped for each angle, and the control packet may further include rotation information indicating rotation of the direction shape.

In accordance with the lighting effect directing method of the light emitting device according to an embodiment of the inventive concept, the light emitting device may be provided with a second table in which a calculation value required for the direction shape is mapped for each magnification, and the control packet may further include second indication information indicating a size change of the direction shape.

According to an embodiment, a lighting effect directing method of a lighting control system including a lighting emitting control device and a light emitting device includes determining, by the light emitting device, coordinates of the light emitting device at a seat based on seat information thus received, receiving and storing, by the light emitting device, a lighting map predefined to express a direction shape and a masking map predefined to cover at least part of the direction shape, broadcasting, by the light emitting control device, a control packet including object information indicating at least one of a plurality of partial objects included in the lighting map, mask information indicating at least one of a plurality of masking layers included in the masking map, and color information indicating a light emission color, receiving and decoding, by the light emitting device, the control packet, determining, by the light emitting device, whether the light emitting device is included in at least one of the partial object and the masking layer, based on the object information and the mask information, and emitting light in a first color when the light emitting device is included in only the partial object, and emitting light in a second color when the light emitting device is included in both the partial object and the masking layer.

According to an embodiment, a light emitting device of a lighting control system includes a communication unit that communicates with an external device, a processor that determines first coordinates of the light emitting device at a seat based on seat information thus received, receives and stores a lighting map predefined to express a direction shape and a masking map predefined to cover at least part of the direction shape, receives a control packet, which includes object information indicating at least one of a plurality of partial objects included in the lighting map, mask information indicating at least one of a plurality of masking layers included in the masking map, and color information indicating a light emission color, and which is broadcast, and emits light corresponding to the light emission color when it is determined based on the object information and the mask information that the light emitting device is included in the indicated partial object, and dynamically expresses the direction shape by omitting light emission when it is determined that the light emitting device is also doubly included in the indicated masking layer, a memory that stores pieces of data and instructions for an operation of the light emitting device, and a light emitting unit including one or more light source elements.

In accordance with the light emitting device of the lighting control system according to an embodiment of the inventive concept, the object information may include an object number indicating one of a plurality of direction scenes, activation information of the plurality of partial objects included in a lighting map corresponding to indicated object number, and coordinate information of a first reference origin of the lighting map. An object origin of the lighting map may be a center of the direction shape, and the first coordinates may be relatively determined based on the first reference origin.

In accordance with the light emitting device of the lighting control system according to an embodiment of the inventive concept, the processor may further determine a first location relationship between a first reference origin of the lighting map and the first coordinates, based on the object information, and determine a second location relationship between a second reference origin of the masking map and the first coordinates, based on the mask information. When the processor determines the second location relationship, the processor may determine the at least one expression level based on a distance between the second reference origin and the first coordinates.

In accordance with the light emitting device of the lighting control system according to an embodiment of the inventive concept, the light emitting device may include a first table in which a calculation value required for rotation conversion is mapped for each angle, and the control packet may further include rotation information indicating rotation of the direction shape.

In accordance with the light emitting device of the lighting control system according to an embodiment of the inventive concept, the light emitting device may include a second table in which a calculation value required for the direction shape is mapped for each magnification, and the control packet may further include second indication information indicating a size change of the direction shape.

In accordance with the lighting effect directing method of the light emitting device according to an embodiment of the inventive concept, the above-described solution may be a computer program stored in a computer readable recording medium to be combined with a computer to execute a lighting effect directing method.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 5 is a diagram illustrating a masking map including a plurality of masking layers, according to an embodiment of the inventive concept;

FIG. 6 is a table showing whether a lighting map is activated for each object number, and a bit expression according to the activation in binary and hexadecimal notation, and FIG. 7 is a table showing whether a masking map is activated for each object number, and a bit expression according to the activation in binary and hexadecimal notation;

FIG. 9 is a structure diagram of a control packet, according to an embodiment of the inventive concept;

FIG. 20 is a structure diagram of a control packet, according to an embodiment of the inventive concept;

FIG. 21 is a rotation mapping table indicating rotation information, according to an embodiment of the inventive concept, and FIG. 22 is a scene for a rotated direction object, according to an embodiment of the inventive concept; and FIG. 23 is a resizing mapping table including resizing information, according to an embodiment of the inventive concept, and FIG. 24 is a scene for a resized direction object, according to an embodiment of the inventive concept.

DETAILED DESCRIPTION

Figure 1:
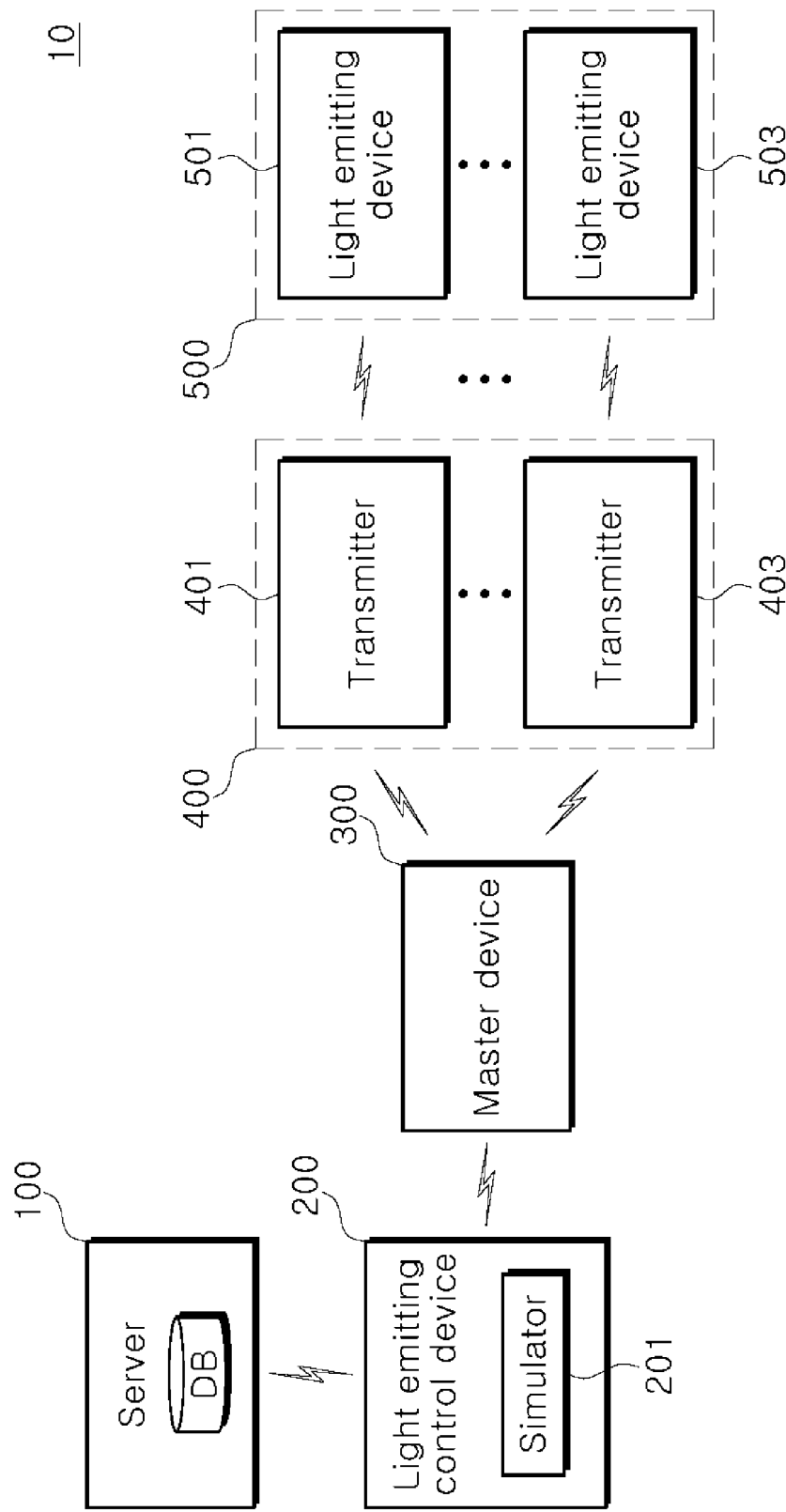
FIG. 1 is a conceptual diagram illustrating a lighting effect directing system, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms may include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" may include each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

A word "exemplary" is used herein in the sense of "being used as an example or illustration". An embodiment described herein as "exemplary" is not necessarily to be construed as preferred or advantageous over other embodiments.

Embodiments of the inventive concept may be described in terms of a function or a block performing a function. A block capable of being referred to as a 'unit' or a 'module' of the inventive concept is physically implemented by analog or digital circuits such as logic gates, integrated circuits, microprocessors, microcontrollers, memories, passive electronic components, active electronic components, optical components, hardwired circuits, and the like and may be selectively driven by firmware and software. The term "unit" used herein may refer to software or hardware such as field programmable gate array (FPGA) or application specific integrated circuit (ASIC), and the "unit" may perform some functions. However, the "unit" may be not limited to software or hardware. The "unit" may be configured to exist in an addressable storage medium or may be configured to play one or more processors. Therefore, as an example, "units" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" and elements may be combined into a smaller number of "units" and elements or may be divided into additional "units" and elements.

Embodiments of the inventive concept may be implemented by using at least one software program running on at least one hardware device and may perform a network management function of controlling an element.

As illustrated in the figures, spatially relative terms, such as "below", "beneath", "lower", "above", "upper", and the like, may be used herein for ease of description to describe the relationship between one component and other components. It will be understood that the spatially relative terms are intended to encompass different orientations of the components in use or operation in addition to the orientation depicted in the figures. For example, when inverting a component shown in the figures, a component described as "below" or "beneath" of another component may be placed "above" another element. Thus, the exemplary term "below" may include both downward and upward directions. The components may also be oriented in different directions, and thus the spatially relative terms may be interpreted depending on orientation.

Unless otherwise defined, all terms (including technical and scientific terms) used herein have the same meaning as commonly understood by those skilled in the art to which the inventive concept pertains. The terms, such as those defined in commonly used dictionaries, should not be interpreted in an idealized or overly formal sense unless expressly so defined herein.

Hereinafter, an embodiment of the inventive concept will be described in detail with reference to the accompanying drawings.

FIG. 1 is a conceptual diagram illustrating a lighting effect directing system 10, according to an embodiment of the inventive concept.

Referring to FIG. 1, according to an embodiment of the inventive concept, a lighting effect directing system 10 in a performance hall may include a server 100, a light emitting control device 200, a master device 300, a transmitter 400, and a light emitting device 500. The server 100 may include a database DB. The light emitting control device 200 may include a simulator 201 for expressing, conceiving, and designing a scenario. The lighting effect directing system 10 may direct various types of light emission patterns for performance direction such as cheering in audience seats in the performance hall by controlling a light emitting state of the light emitting device 500 by using the light emitting control device 200.

The server 100 may build the database DB that stores various data necessary to direct a lighting effect. The database DB may provide various performance data to the light emitting control device 200 through wired communication, wireless communication, or a method of directly providing data. For example, the server 100 may provide performance data to the light emitting control device 200 through a wired network method such as a coaxial cable or a wired local area network (LAN) (e.g., Ethernet). For example, on a mobile communication network built according to a mobile communication standard communication method, the server 100 may provide performance data in a form of a packet to the light emitting control device 200. For example, the database DB stored in the server 100 may be physically installed into the light emitting control device 200 through a storage medium such as a removable disk.

The light emitting control device 200 may perform a function of controlling the light emitting device 500 for the performance direction in the performance hall. For example, the light emitting control device 200 may be one of electronic devices such as a mobile phone, a smart phone, a laptop computer, a digital broadcasting terminal, a personal digital assistant (PDA), a portable multimedia player (PMP), a navigation system, a slate PC, a tablet PC, an ultrabook, and a wearable device, for example, a smart watch, a glass-type terminal (e.g., a smart glass), a head mounted display (HMD), or the like. The light emitting control device 200 may include all electronic devices capable of installing and executing an application related to an embodiment, may include some of configurations of the electronic device, or may be implemented in various forms capable of interworking therewith.

According to an embodiment of the inventive concept, the light emitting control device 200 may be one of software for PC and an electronic device such as MA Lighting grandMA2, grandMA3, ETC EOS, ETC ION, ETC GIO, Chroma Q Vista, High End HOG, High End Fullboar, Avolites Sapphire Avolites Tiger, Chamsys MagicQ, Obsidian control systems Onyx, Martin M6, Martin M1, Nicolaudie Sunlite, ESA, ESA2, Lumidesk, SunSuite, Arcolis, Daslight, LightRider, MADRIX, DJ LIGHT STUDIO, DISCO-DESIGNER VJ STUDIO, Stagecraft, Lightkey, or the like.

The light emitting control device 200 may include the simulator 201 for directing a lighting effect. The simulator 201 may be an electronic device that implements virtual simulation for implementing lighting effects, software that runs on the electronic device, or a complex device that combines the software and the electronic device. For example, a user may enter an electronic signal corresponding to a scene to be directed on the simulator 201. The simulator 201 may convert the entered electronic signal to conform to the protocol of the light emitting control device 200 and may provide the converted electronic signal to the light emitting control device 200 so as to be driven by the light emitting control device 200.

In an embodiment, the light emitting control device 200 may include appropriate software or a computer program for controlling the light emitting device 500. For example, the light emitting control device 200 may include DMX512, RDM, Art-Net, sACN, ETC-Net2, Pathport, Shownet, or KiNET as a protocol for controlling the light emitting device 500. The light emitting control device 200 may transmit a data signal (e.g., an emission control signal) in an appropriate format such as DMX512 or Art-Net, sACN, ETC-Net2, Pathport, Shownet or KiNET. The light emitting control device 200 may generate an emission control signal for controlling the light emitting device 500. The emission control signal may be broadcast to the light emitting device 500, and thus one or more light emitting devices may emit light depending on the emission control signal. The emission control signal may include information about an emission state (e.g., an emission color, a brightness value, a blinking speed, or the like).

In an embodiment, the light emitting control device 200 may include a plurality of input/output ports. The light emitting control device 200 may have an input/output port corresponding to or related to a specific data signal format or protocol. For example, the light emitting control device 200 may have a first port dedicated to RDM and DMX512 data input/output and a second port dedicated to Art-Net and sACN, ETC-Net2, Pathport, Shownet, KiNET data input/output. The DMX512, RDM, Art-Net, sACN, ETC-Net2, Pathport, Shownet and KiNET protocols are widely known as control protocols for stage lighting installations. According to embodiments, the light emitting control device 200 may plan more flexible control for the light emitting device 500 by using control protocols such as DMX512, RDM, Art-Net, sACN, ETC-Net2, Pathport, Shownet, and KiNET.

Various scenarios may be pre-determined and stored in the simulator 201 or entered from the user. The scenario may be a design drawing designed to induce a lighting effect by using the light emitting device 500 throughout the performance time. A performance director may design the scenario and may enter the scenario into the simulator 201 so as to match the scenario. The scenario may be different for each scene of the performance or for each performance song of the performance, and thus may function as a design drawing for directing a cheering effect corresponding to each scene of the performance.

According to an embodiment of the inventive concept, a simulator 201 may create a direction object based on the size of a performance hall, the seating arrangement of the performance hall, and the direction shape, which is a light emitting shape in a seat of the light emitting device 500 to be directed during the performance, and may provide a user-friendly tool for generating a direction object. When a direction object is created in the simulator 201, the object origin of the direction object may be set in advance or may be defined as a specific location. For example, the object origin may be set or defined as a characteristic part of the direction object, the midpoint of the outline of the direction object, and the center of mass (COM) of the direction object. When the object origin for the specific direction object has already been set, the simulator 201 may omit an operation of newly setting the object origin for the same direction object.

According to an embodiment of the inventive concept, the simulator 201 may use a scene in an image storage format (e.g., BMP, JPG, GIF, TIFF, TIF, Exif, PNG, PPM, PGM, PBM, PNM, SVG, or the like) or a video storage format (e.g. mp4, avi, mov, wmv, mkv, flv, f4v, swf, VP8, VP9, webm, MPG, or the like), which is existing widely used for a direction object.

According to an embodiment of the inventive concept, the simulator 201 may specify one similar color in a scene to simplify direction shape and to reduce data throughput. The simulator 201 may define the border of the direction shape to separate the direction object from the background, and may make the background area transparent other than the direction shape or may specify a background color (e.g., black).

According to an embodiment of the inventive concept, the simulator 201 may separate an active area, which is a main representation area of the direction object, and a background area, which is a peripheral area.

According to an embodiment of the inventive concept, the simulator 201 may create a lighting map for representing the direction shape or may support a user tool for generating a lighting map. The lighting map is a direction map including possible cases, in each of which all directions capable of being represented as a direction object are possible. A performance director may selectively emit light of a plurality of light emitting devices located at seats in a performance hall by using at least part of the lighting map, thereby inducing a dynamic effect.

According to an embodiment of the inventive concept, the lighting map may include a plurality of partial objects, and each partial object may form a single direction object or may form a part of a single direction object. In other words, a direction object may include at least one partial object. The lighting map will be described in more detail with reference to FIG. 4.

According to an embodiment of the inventive concept, the simulator 201 may create a masking map, in which expression levels are defined radially from the center of the object, or may support a user tool for creating the masking map. The expression level of the masking map may be set to maintain the shape of the object origin defined at the center of the object, and expression levels, each of which sequentially has a high order may be set in proportion to a location relationship with the center coordinates.

According to an embodiment of the inventive concept, the masking map may include a plurality of masking layers, and the masking map may be a means capable of dynamically representing a direction object by masking a part of the direction shape. Each masking layer may mask one direction object or a part of the one direction object. In other words, the direction object may be covered by at least one masking layer. The masking map will be described in more detail with reference to FIG. 5.

The master device 300 may be provided for efficient signal transmission in a performance hall. The master device 300 may include the database DB. The master device 300 may receive a control signal from the light emitting control device 200. The master device 300 may include information of the database DB stored in the master device 300 in the control signal and may provide the control signal to the transmitter 400 or directly provide the control signal to the light emitting device 500. The master device 300 may be an electronic device such as a mobile phone, a smart phone, a laptop computer, a digital broadcasting terminal, a personal digital assistant (PDA), a portable multimedia player (PMP), a navigation system, a slate PC, a tablet PC, an ultrabook, and a wearable device, (e.g., a smart watch, a glass-type terminal (e.g., a smart glass), a head mounted display (HMD), or the like), but is not limited thereto. The master device 300 may not be necessarily provided as a separate hardware device, and may be combined and implemented as a part of the light emitting control device 200 or as a part of the transmitter 400.

The transmitter 400, which is a part of a communication device, may perform a function of amplifying or delivering an emission control signal received from the light emitting control device 200 or the master device 300. For example, the transmitter 400 may be implemented as a communication device such as an antenna. The transmitter 400 may transmit, to the light emitting device 500, an emission control signal, which is received from the light emitting control device 200 and which is received from the master device 300. When the transmitter 400 receives the emission control signal for controlling emission of the light emitting device 500 from the light emitting control device 200 and transmits the emission control signal to the light emitting device 500, the light emitting device 500 may emit light to correspond to an emission pattern included in the emission control signal.

In an embodiment, the transmitter 400 may be the common name for a plurality of transmitters. For example, the transmitter 400 may include a first transmitter 401, a second transmitter 402, and the like. For example, the plurality of transmitters may be provided in the performance hall. The first transmitter 401 for the first zone and the second transmitter 402 for the second zone are provided such that a wireless control signal is capable of being efficiently transmitted to each seat.

In an embodiment, it is disclosed that the transmitter 400 is a separate device from the light emitting control device 200. However, the light emitting control device 200 may include a communication module performing the same role as the transmitter 400. Accordingly, the light emitting control device 200 may perform the same role as the transmitter 400 according to embodiments. The light emitting device 500 may receive the emission control signal from the light emitting control device 200 and then may emit light.

The transmitter 400 according to an embodiment of the inventive concept may have directivity. In a performance planning stage, the performance planner may arrange the transmitter 400 in consideration of the specification of a transmitter used in the corresponding performance. Accordingly, the light emitting device 500 may receive an emission control signal from the transmitter 400 having identification information corresponding to identification information of a transmitter pre-stored in the light emitting device 500.

Furthermore, the emission control signal generated from the light emitting control device 200 may be received by the master device 300. The master device 300 may convert the emission control signal into a wireless control signal. The master device 300 may deliver the converted wireless control signal to the transmitter 400. The transmitter 400 may broadcast the wireless control signal to the light emitting device 500 in the performance hall by using wireless communication (e.g., RF communication, or the like). Here, the wireless control signal may be generated by converting control data into a form for controlling the light emitting device 500 in a wireless communication method. The broadcasting may be understood as a concept in which a plurality of light emitting devices receive a common signal and process an operation corresponding to the common signal.

Under the control of the light emitting control device 200, the light emitting device 500 may perform a function of directing various types of light emission patterns in real time by the light emitting control device 200 or depending on predetermined control information.

In an embodiment, the light emitting device 500 may include a light emitting element such as a liquid crystal display (LCD) or light emitting diode (LED) or may be connected to the light emitting element. The light emitting device 500 may be a device including any electronic device capable of wireless communication, and may be a small cheering tool carried by an audience in the performance hall such as an athletic stadium or a concert hall. For example, the light emitting device 500 may correspond to a mobile phone, the wireless light emitting device 500, a lighting stick, a lighting bar, a lighting ball, a lighting panel, and a device attached with a light source that is wirelessly controllable. In an embodiment, the light emitting device 500 may be referred to as a lighting device, a receiver, a controlled device, a slave, or a slave lighting device. Also, the light emitting device 500 may include a wearable device capable of being attached to and/or worn on a part of the body such as a wrist or chest.

In an embodiment, on the basis of identification information of the transmitter 400 thus previously stored, the light emitting device 500 may interpret the emission control signal received from the transmitter 400 and may emit light. In detail, the light emitting device 500 may compare the pre-stored identification information of the transmitter 400 with identification information of a transmitter included in the emission control signal. When the pre-stored identification information of the transmitter 400 is the same as identification information of a transmitter included in the emission control signal, light emitting device 500 may emit light to correspond to an emission pattern included in the corresponding emission control signal.

In an embodiment, the light emitting device 500 may be the common name for a plurality of light emitting devices. For example, the light emitting device 500 may include a first light emitting device 501, a second light emitting device 502, and the like. For example, a plurality of light emitting devices may be located in the performance hall. The first light emitting device 501 located in the first zone may receive a control signal from the first transmitter 401, and the second light emitting device 502 located in the second zone may receive a control signal from the second transmitter 402. Accordingly, even though a plurality of light emitting devices are located in the performance hall, distribution processing of the control signal may be possible.

According to an embodiment of the inventive concept, a lighting effect directing method of the lighting effect directing system 10 may selectively control the emission of a plurality of light emitting devices based on a masking layer, thereby inducing dynamic imaging effects such as moving images in a direction object. A method of inducing a dynamic effect of a direction object by controlling the light emitting device 500 by using a masking layer will be described with reference to the following drawings.

Figure 2:
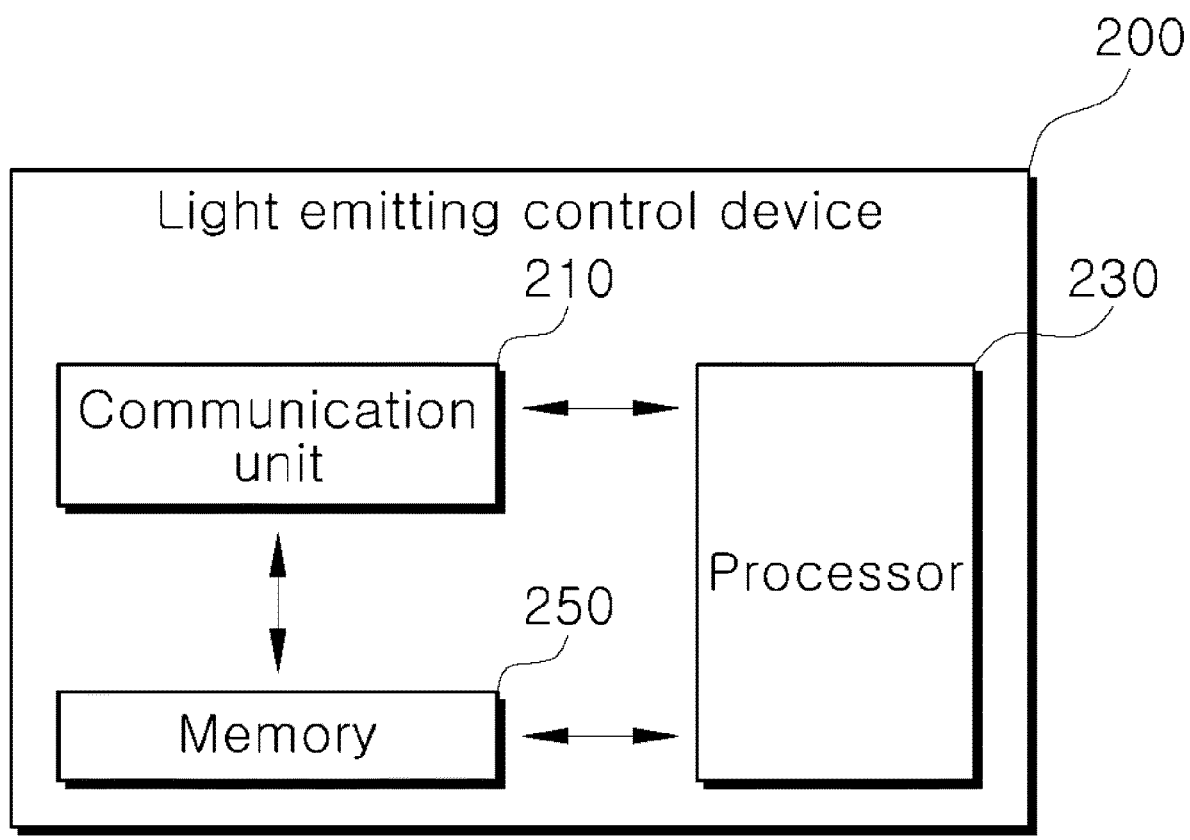
FIG. 2 is a block diagram illustrating a light emitting control device, according to an embodiment of the inventive concept.

FIG. 2 is a block diagram illustrating the light emitting control device 200, according to an embodiment of the inventive concept. A description the same as the description of FIG. 1 will be omitted to avoid redundancy.

The light emitting control device 200 may include a communication unit 210, a processor 230, and a memory 250.

The communication unit 210 may communicate with various types of external devices depending on various types of communication methods. The communication unit 210 may include at least one of a wireless-fidelity (WiFi) chip, a Bluetooth™ chip, a wireless communication chip, a near field communication (NFC) chip, and a radio frequency identification (RFID) chip.

According to the mobile communication technology of the inventive concept, the communication unit 210 may exchange a wireless signal with at least one of a base station, an external terminal, and an external server on a mobile communication network established depending on technical standards or communication methods (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

Moreover, the wireless technologies according to an embodiment of the inventive concept includes, for example, wireless LAN (WLAN), Wireless-Fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

In addition, the communication technology of the inventive concept may include a communication support technology by using at least one of Bluetooth, radio frequency identification (RFID), infrared data association (IrDA), ultra wideband (UWB), ZigBee, near field communication (NFC), Wi-Fi, Wi-Fi Direct, wireless universal serial bus (USB), transistor-transistor logic (TTL), USB, IEEE1394, Ethernet, musical instrument digital interface (MIDI), RS232, RS422, RS485, optical Communication, or coaxial cable communication.

The processor 230 may control overall operations of the light emitting control device 200 and, in more detail, may control operations of the remaining components implementing the light emitting control device 200. The processor 230 may be implemented with a general-purpose processor, a special-purpose processor, or an application processor. In an embodiment, the processor 230 may be implemented as an operation processor (e.g., a central processing unit (CPU), a graphic processing unit (GPU), an application processor (AP), and the like) including dedicated logic circuits (e.g., a field programmable gate array (FPGA), an application specific integrated circuits (ASICs), and the like), but is not limited thereto.

The memory 250 may be a local storage medium supporting various functions of the light emitting control device 200. The memory 250 may store a simulator 201 of FIG. 1 capable of being driven in the light emitting control device 200, an application program, pieces of data for operation of the light emitting control device 200, and commands. At least part of the application programs may be downloaded from an external device (e.g., the server 100) through wireless communication. The application program may be stored in the memory 250, may be installed in the light emitting control device 200, and may be driven by the processor 230 of the light emitting control device 200 to perform an operation (or function).

The memory 250 may be a dynamic random access memory (DRAM) such as a double data rate synchronous dynamic random access memory (DDR SDRAM), a low power double data rate (LPDDR) SDRAM, a graphics double data rate (GDDR) SDRAM, a rambus dynamic random access memory (RDRAM), DDR2 SDRAM, DDR3 SDRAM, or DDR4 SDRAM.

However, embodiments according to an embodiment of the inventive concept need not be limited thereto. In an embodiment, even when a power supply to the light emitting control device 200 is cut off, data needs to be stored. Accordingly, the memory 250 according to an embodiment of the inventive concept may be provided as a writable non-volatile memory to reflect changes. However, an embodiment is not limited thereto. For example, a flash memory, EPROM or EEPROM, resistive memory cells such as a resistive RAM (ReRAM), a phase change RAM (PRAM), a magnetic RAM (MRAM), a spin-transfer torque MRAM, a conductive bridging RAM (CBRAM), a ferroelectric RAM (FeRAM), and other various types of memory may be applied to the memory 250. Alternatively, the memory 250 may be implemented with various types of devices such as an embedded multimedia card (eMMC), universal flash storage (UFS), compact flash (CF), secure digital (SD), micro secure digital (Micro-SD), mini secure digital (Mini-SD), extreme digital (xD) or memory stick. For convenience of description in an embodiment of the inventive concept, it is described that all pieces of instruction information are stored in the single memory 250. However, an embodiment is not limited thereto. For example, the memory 250 may include a plurality of memories.

According to an embodiment of the inventive concept, the light emitting control device 200 may generate a control packet including object information indicating at least one of a plurality of partial objects included in the lighting map, and mask information indicating at least one of a plurality of masking layers included in the masking map. According to an embodiment, the control packet may further include color information indicating a light emission color.

According to an embodiment, the control packet may further include direction background color information. For example, the direction background color may be set to black or a color that matches a dark seat environment, but is not limited thereto. For example, in a case of outdoor performances, a case of afternoon performances, or a case where seats are illuminated, the direction background color may be set as white or a bright color. The control packet may directly provide an RGB code for the direction background color, and may provide information indicating a direction background color pre-stored in the memory 550.

According to an embodiment, the direction background color may not be included in the control packet. In this case, the light emitting device 500 may emit light with a direction background color pre-stored in the memory 550 or may omit (or skip) a light emission operation.

The control packet may be finally provided to the light emitting device 500. Accordingly, when it is determined that the light emitting device 500 is included in the partial object, the light emitting device 500 may emit light corresponding to the light emission color. When it is determined that the light emitting device 500 is also doubly included in the indicated masking layer, the light emitting device 500 may maintain the previous light emission color by omitting the light emission operation, may emit light in the direction background color (e.g., black) received through the control packet, or may emit light in the predetermined direction background color (e.g., black), thereby dynamically expressing the direction shape. According to an embodiment, while not including color information, the light emitting control device 200 may generate a control packet including only object information and mask information. In this case, the light emitting device 500 may emit light in a predefined direction background color (e.g., black) without color information, or may emit light in a predefined separate color.

According to an embodiment of the inventive concept, object information included in the control packet may include an object number indicating one of a plurality of direction scenes, activation information of a plurality of partial objects included in the lighting map corresponding to the indicated object number, and coordinate information of a first reference origin of the lighting map, but is not limited thereto. For example, the object origin of the lighting map may be the center of the direction shape, and the first coordinates may be relatively determined based on the first reference origin.

According to an embodiment of the inventive concept, mask information included in the control packet may include a mask number indicating one of a plurality of mask shapes, activation information of a plurality of masking layers included in the masking map corresponding to the indicated mask number, and coordinate information of a second reference origin of the masking map, but is not limited thereto.

According to an embodiment of the inventive concept, the light emitting control device 200 may broadcast the control packet to the light emitting device 500 located in a seat. Accordingly, data may be collectively provided to hundreds to tens of thousands of the light emitting devices 500 located in a seat. Compared to a case where control packets are individually provided to hundreds to tens of thousands of the light emitting devices 500, data processing speed is improved.

Figure 3:
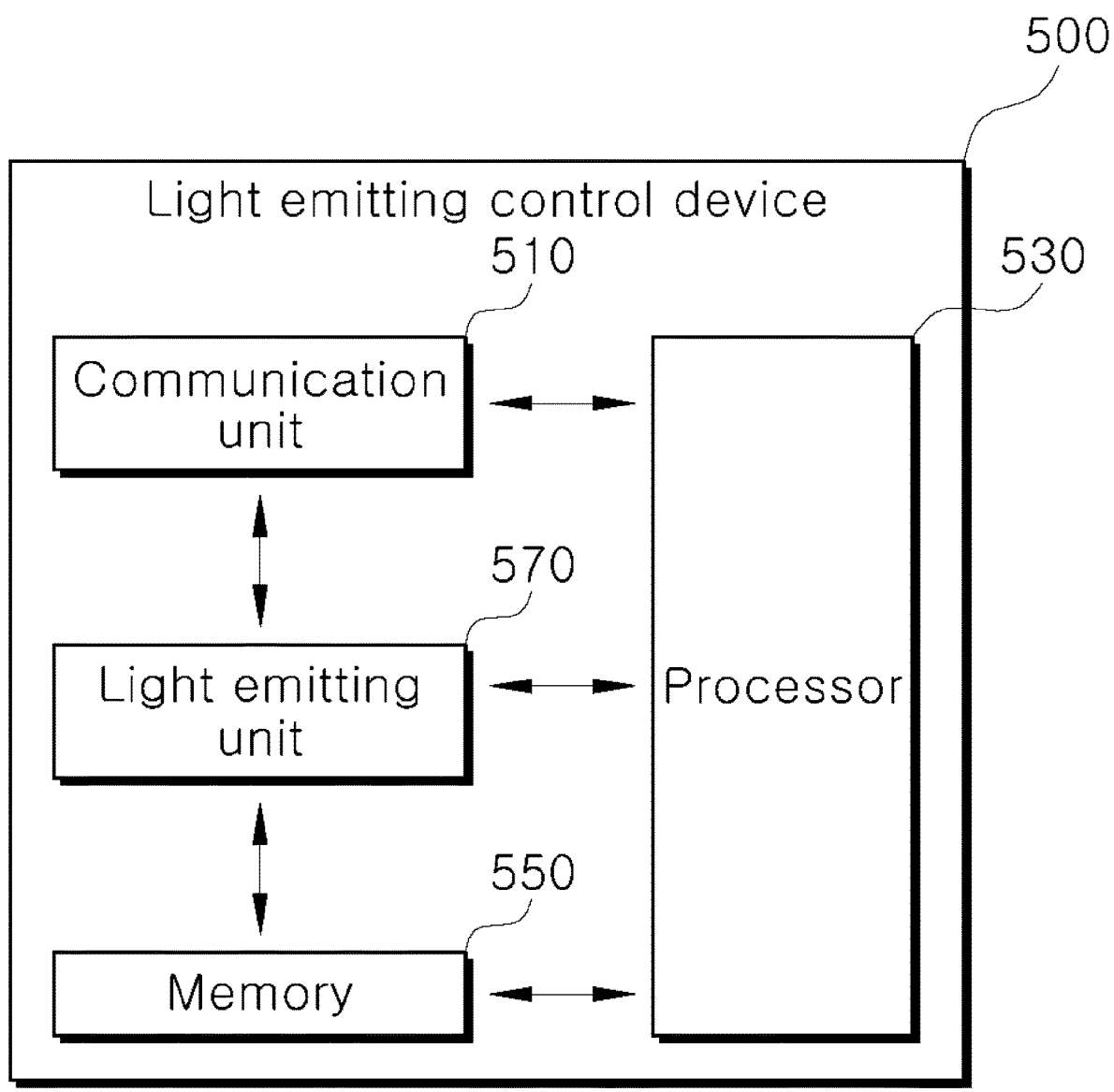
FIG. 3 is a block diagram illustrating a light emitting device, according to an embodiment of the inventive concept.

FIG. 3 is a block diagram illustrating the light emitting device 500, according to an embodiment of the inventive concept. A description the same as the description of FIGS. 1 and 2 will be omitted to avoid redundancy.

The light emitting device 500 may include a communication unit 510, a processor 530, a memory 550, and a light emitting unit 570.

The communication unit 510 may communicate with various types of external devices depending on various types of communication methods. The communication unit 510 may include at least one of a wireless-fidelity (WiFi) chip, a Bluetooth™ chip, a wireless communication chip, a near field communication (NFC) chip, and a radio frequency identification (RFID) chip.

According to an embodiment, the communication unit 510 may support a common protocol to communicate with the communication unit 210 of FIG. 2. For example, the communication unit 510 may exchange a wireless signal with at least one of a base station, an external terminal, and an external server on a mobile communication network established according to GSM, CDMA, CDMA2000, EV-DO, WCDMA, HSDPA, HSUPA, LTE, LTE-A, or the like, or may communicate with the communication unit 210 by using at least one of WLAN, Wi-Fi, Wi-Fi Direct, DLNA, WiBro, WiMAX, Bluetooth™, RFID, Infrared Data Association (IrDA), ultra wideband (UWB), ZigBee, near field communication (NFC), wireless universal serial bus (Wireless USB), transistor-transistor logic (TTL), USB, IEEE1394, Ethernet, a musical instrument digital interface (MIDI), RS232, RS422, RS485, optical Communication, coaxial cable communication schemes.

The processor 530 may control overall operations of the light emitting device 500 and, in more detail, may control operations of the remaining components implementing the light emitting device 500. The processor 530 may be implemented with a general-purpose processor, a special-purpose processor, or an application processor. In an embodiment, the processor 530 may be implemented as an operation processor (e.g., a central processing unit (CPU), a graphic processing unit (GPU), an application processor (AP), and the like) including a digital signal processor (DSP) capable of converting an analog signal into a digital signal and performing high-speed processing, a micro controller unit (MCU), or a dedicated-logic circuit (e.g., a field programmable gate array (FPGA), an application specific integrated circuits (ASICs), and the like) supporting the necessary operations in the light emitting device 500, but is not limited thereto.

According to an embodiment of the inventive concept, the processor 530 may actually perform calculations required by the light emitting device 500. For example, when it is determined based on object information and mask information that the light emitting device 500 is included in the indicated partial object, the processor 530 may emit light corresponding to the light emission color. When it is determined that the light emitting device 500 is also doubly included in the indicated masking layer, the processor 530 may omit light emission and may maintain the previous light emission color or emit light or emit light in a preset direction background color (e.g., black), thereby dynamically expressing the direction shape.

As described above, the control packet may include object information and mask information, and may selectively further include color information indicating a light emission color. According to an embodiment, the light emitting device 500 may receive a control packet including only object information and mask information without color information, and may emit light in a predefined direction background color (e.g., black) without the color information, or emit light in a predefined separate color.

For example, the processor 530 may determine a location relationship between the reference origin of the lighting map and device coordinates as a location on a seat of the light emitting device 500, based on object information, and may determine a second location relationship between the reference origin of the masking map and the device coordinates, based on the mask information. The operation and determination of the processor 530 in the light emitting device 500 will be described in more detail with reference to FIGS. 17 and 18.

Moreover, the processor 530 may perform a linear algebraic matrix operation for rotating the direction object based on a rotation mapping table, or may perform an operation for changing the size of a direction object based on resizing mapping data. Rotation and resizing will be described in more detail with reference to FIGS. 21, 22, 23 and 24.

The memory 550 may be a local storage medium supporting various functions of the light emitting control device 200. The memory 550 may store data and commands for the operation of the light emitting device 500. At least part of the application programs may be downloaded from an external device (e.g., the server 100) through wireless communication. The application program may be stored in the memory 550, may be installed in the light emitting device 500, and may be driven by the processor 530 of the light emitting device 500 to perform an operation (or function).

Even when a power supply to the light emitting device 500 is cut off, data needs to be stored. Accordingly, the memory 550 according to an embodiment of the inventive concept may be provided as a writable non-volatile memory to reflect changes. For example, the memory 550 may be implemented with a non-volatile memory such as a flash memory, a magnetic RAM (MRAM), a spin-transfer torque MRAM, a conductive bridging RAM (CBRAM), a ferroelectric RAM (FeRAM), a phase change RAM (PRAM), and a resistive RAM (ReRAM). However, embodiments of the inventive concept need not be limited thereto. For example, the memory 550 may be implemented with a dynamic random access memory (DRAM) such as a double data rate synchronous dynamic random access memory (DDR SDRAM), a low power double data rate (LPDDR) SDRAM, a graphics double data rate (GDDR) SDRAM, a rambus dynamic random access memory (RDRAM), DDR2 SDRAM, DDR3 SDRAM, or DDR4 SDRAM.

According to an embodiment, the memory 550 may store seat information of a ticket held by an audience. The seat information of a ticket stored by the memory 550 may include at least one of seat information displayed on a ticket (e.g., seat 1 in row A), location information (e.g., GPS-based information of the corresponding seat, the predetermined number according to the seat map, or the like) of the corresponding seat among seats in a performance hall, and identification information (e.g., the top left seat among 50,000 seats is 'No. 1' when performance direction data is generated) of the corresponding seat, or user information.

According to an embodiment, the memory 550 may store seat information, which is entered from the outside and provided to the light emitting device 500, and may determine the coordinates of the light emitting device 500 by reading out the seat information stored in the memory 550. However, an embodiment is not limited thereto. For example, the memory 550 may store seat information obtained directly from the light emitting device 500. According to an embodiment, data stored in the memory 550 may be entered into the light emitting device 500 in a form of firmware in the production stage of the light emitting device 500, or may be entered through an application installed in a terminal (e.g., a smartphone or a tablet PC) of an audience who possesses the light emitting device 500 before or after the entrance to the performance hall.

According to an embodiment, the light emitting device 500 may provide the seat information to the server 100. For example, the light emitting device 500 may directly provide a signal including the seat information to the server 100 through the communication unit 510, may provide the signal to the server 100 through a user's smart device (not shown), or may provide the signal to the server 100 through the master device 300. The server 100 may centrally manage performance data by storing the seat information.

In an embodiment, an audience being a user may connect a light emitting device to a terminal possessed by the audience, and may download control-related information for performance direction from an external server through an application installed in the terminal to store the control-related information in the memory 550. The connection may be made through short-range wireless communication or a physical connection between the terminal and the light emitting device 500.

In an embodiment, the data stored by the memory 550 may be entered during a ticket check process before admission. In detail, the audience may perform a performance ticket checking step before entering the performance hall. In this case, a performance staff may directly enter seat information included in a ticket into the light emitting device 500 by hand or may receive the seat information included in the ticket by using an OCR function or a 2D electronic code reader function expressed as a barcode or a QR code through an information check device (not shown). The performance staff may provide the light emitting device 500 with control-related information associated with location information corresponding to the seat information and may store the control-related information in the memory 550.

In an embodiment, the performance data may be location information for each seat in the performance hall. Moreover, the information check device may provide the light emitting device 500 with the control-related information associated with location information through real-time communication with an external server (e.g., 100 in FIG. 1) in the performance hall or may store the control-related information associated with location information in advance at a step of planning a performance and may provide the control-related information to the light emitting device 500 in the performance hall.

In an embodiment, the information check device may include an electronic device such as a kiosk (not shown). In this case, the audience may directly perform the performance ticket checking step through the kiosk. The kiosk may receive electronic code information (in other words, information read through a barcode, a QR code, a RFID, a NFC, or the like) included in the ticket, may provide the light emitting device 500 with the control-related information associated with location information corresponding to the electronic code information, and may store the control-related information in the memory 550. In this case, the kiosk may store the control-related information associated with location information in advance, through communication with an external server (e.g., 100 in FIG. 1) or at a step of planning a performance.

According to an embodiment of the inventive concept, the memory 550 may store a lighting map, a masking map, and color data in advance. As described above, the direction object data may be stored at the production stage of the light emitting device 500 or may be stored in advance before a performance (e.g., being stored before or after the entrance to the performance hall before the start of the performance), thereby smoothly directing lighting effects during the performance.

According to an embodiment of the inventive concept, the lighting map, the masking map, and the color data may be included in a control signal broadcast in a performance hall and may be provided to the light emitting device 500. According to an embodiment, the lighting map, the masking map, and the color data may be provided to the light emitting device 500 as a performance preparation signal separately from a control signal.

According to an embodiment of the inventive concept, the direction object data may include the type of a direction shape, an expression level set differently for each type of the direction shape, rotation mapping data calculated for each predetermined angle for the rotation of the direction shape, or resizing mapping data calculated in advance to resize the direction shape. In an embodiment, the direction object data may function as basic information for determining an operation, such as an operation as to whether the light emitting device 500 emits light, an operation as to whether the light emitting device 500 display a color, an operation as to whether the light emitting device 500 vibrates, or an operation as to whether the light emitting device 500 generates sound.

According to an embodiment of the inventive concept, a resizing mapping table may be a table for adjusting the magnification of a direction object depending on a predetermined size based on a data expression range. A rotation mapping table may be a lookup table in which rotation conversion values capable of being calculated in a method of linear algebra to rotate a direction object are calculated in advance for each predetermined angle.

According to an embodiment of the inventive concept, the color data may include RGB values provided to emit light in a predetermined color depending on a data expression range. To express all colors, RGB values having three color channels need to be indicated with 3 bytes. However, in a scene to be presented in a performance hall, it may not be necessary to substantially express all natural colors, and it may be necessary to reduce the amount of data transmission and throughput. Accordingly, the color data may include a mapping table for some colors to be displayed by the light emitting device 500 depending on scenarios.

The light emitting unit 570 may include one or more light source elements. The light source element may be, for example, a light emitting diode (LED), or the like. Also, the light emitting unit 570 may output light of various colors according to RGB color information by using a light source element.

According to an embodiment of the inventive concept, the light emitting device 500 may determine its own coordinates in a seat based on the received seat information. The communication unit 510 of the light emitting device 500 may receive a lighting map predefined to represent the direction shape, a masking map predefined to mask at least part of the direction shape, and color data predefined to match the data processing unit of the light emitting device. The memory 550 may store the lighting map, the masking map, and the color data. However, the inventive concept is not limited thereto, and does not exclude a case of directly receiving data without using a communication method or storing the lighting map, the masking map, and the color data in advance in a form of firmware at a factory shipment stage.

According to an embodiment of the inventive concept, the communication unit 510 of the light emitting device 500 may receive a control packet including object information indicating at least one of a plurality of partial objects included in the lighting map, mask information indicating at least one of a plurality of masking layers included in the masking map, and color information indicating the light emission color. The control packet may be broadcast. The communication unit 510 may receive the broadcast control packet, and then may search for header information, detect a pilot signal, include a specific data pattern, or identify a data value stored in a specific data slot. Accordingly, the communication unit 510 may determine whether the control packet is information about the light emitting device 500 itself.

For example, when it is determined based on object information and mask information that the light emitting device 500 is included in the indicated partial object, the light emitting device 500 may emit light corresponding to the light emission color. When it is determined that the light emitting device 500 is also doubly included in the indicated masking layer, the light emitting device 500 may omit light emission, thereby dynamically expressing the direction shape. Dynamically expressing the direction shape may refer to expressing a direction object in a form of a moving image (e.g., gif-type image data).

According to an embodiment of the inventive concept, the direction object data stored by the memory 550 of the light emitting device 500 may include information about a direction object. The direction object data may further include direction object attribute information indicating characteristics of the direction object, settings, and summary of specifications. In an embodiment, the direction object attribute information may be positioned in a header of direction object data.

The direction object data may be compressed. For example, the processor 530 may reduce the amount of data by applying a compression algorithm to data bits overlapping the direction object data. For example, the processor 530 may reduce the amount of data by using a correlation between pieces of adjacent data of the direction object data.

According to an embodiment of the inventive concept, all of the light emitting devices 500 may receive the same control packet. Each of the light emitting devices may decode the control packet, and may identify a direction shape, an expression level, reference coordinates, and light emission color included in the control packet. Each of the light emitting devices may determine a location relationship between the reference coordinates and the coordinates of the light emitting device itself, and may determine whether to emit light, based on whether to correspond to a lighting map and a masking map.

Figure 4:
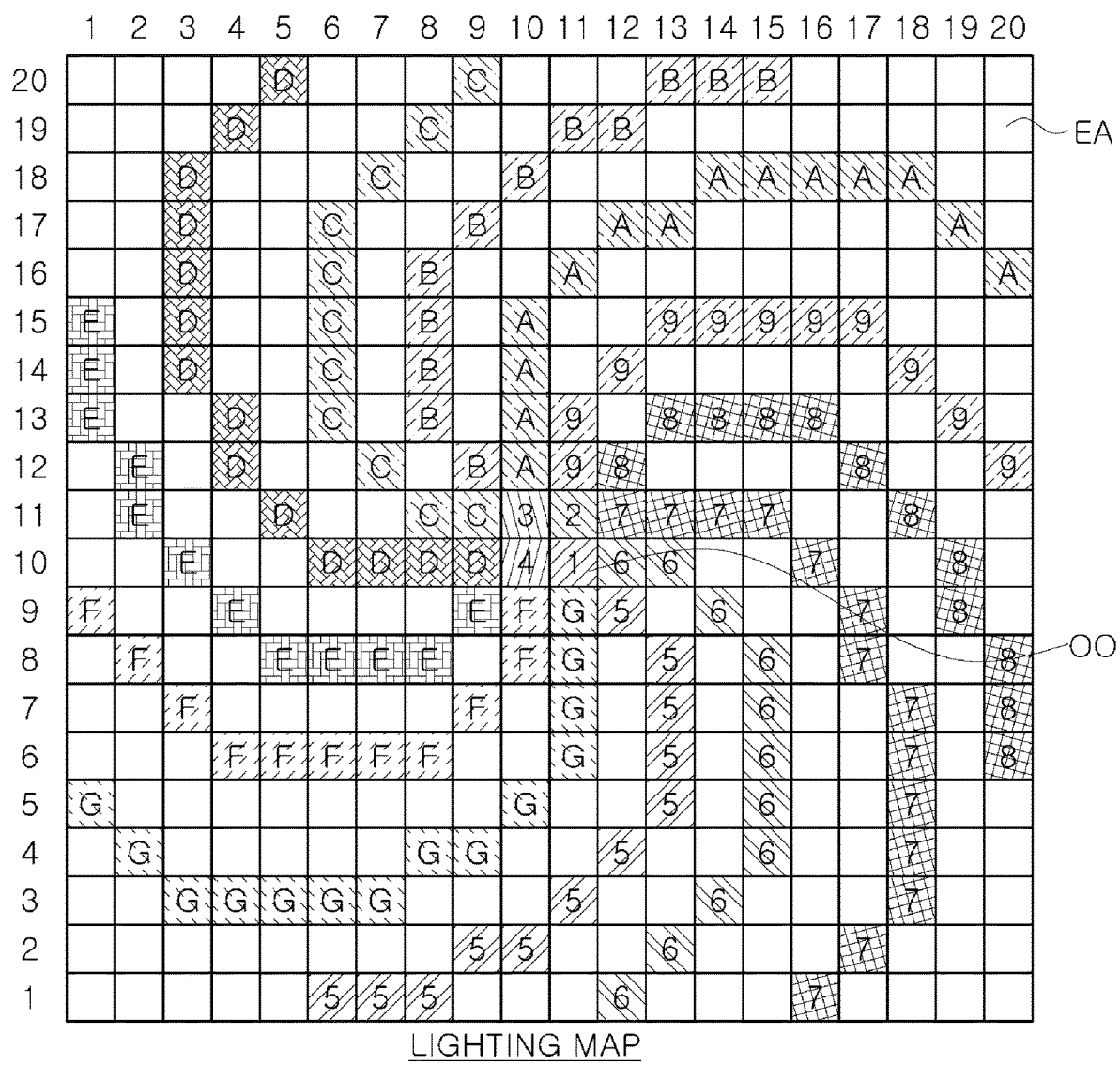
FIG. 4 is a diagram illustrating a lighting map, according to an embodiment of the inventive concept.

FIG. 4 is a diagram illustrating a lighting map LIGHTING MAP, according to an embodiment of the inventive concept.

FIG. 4 may be referred to describe a lighting effect directing method based on the object origin OO.

The lighting map LIGHTING MAP is a direction map including possible cases, in each of which all directions capable of being represented as a direction object are possible. A director of the performance may select unit objects corresponding to a plurality of light emitting devices located at a seat of a performance hall, by using all or part of the lighting map. A set of each selected individual object may form a direction object representing one direction shape.

A direction object may have an external shape represented by the object, and a visual shape of the direction object may be referred to as a "direction shape". In an embodiment of the inventive concept, a direction object may represent a picture, a video, a character string, or font data, but is not limited thereto.

According to an embodiment of the inventive concept, the lighting map is a map representing all possible direction scenarios for representing a plurality of direction objects. The lighting map may include a plurality of partial objects, and each partial object may form a single direction object or may form a part of a single direction object. In other words, a direction object may include at least one partial object.

The lighting map may be created differently depending on a seat size, a shape of a seat, the number of seats, the kind of a performance (including on-site performances and non-face-to-face online performances), and the type of a performance (concerts, sports events, or the like). The director may create a lighting map suitable for each type of the performance through a simulator 201 in FIG. 1. In an embodiment of the inventive concept, for convenience of description, a seat of a performance hall having a unit object of 20×20 (width×height) will be illustrated.

According to an embodiment, audience seats may be interpreted as the space of x-axis and y-axis coordinates. For example, the total of 400 audience seats (i.e., 400 audience seats having 20 audience seats arranged in a row and 20 audience seats arranged in a column) may be set as a unit object for directing one scene SCENE. However, the technical spirit of the inventive concept is not limited to the disclosed numbers and may be transformed into unit objects having various horizontal and vertical values.

According to an embodiment of the inventive concept, the direction object may include an object origin OO, and a location of the object origin OO in the coordinate space may be referred to as "reference coordinates".

The object origin OO may be set in advance or defined as a specific location. For example, the object origin may be set or defined as a characteristic part of the direction object, the midpoint of the outline of the direction object, and the center of mass (COM) of the direction object. For example, when the object origin for the specific direction object has already been set, the simulator 201 may omit an operation of newly setting the object origin for the same direction object.

For example, the center coordinates on the lighting map of the direction shape may be set to the object origin OO (an absolute coordinate method). However, an embodiment is not limited thereto. For example, locations of various direction shapes may be set and changed to the object origin OO. The object origin OO may be predefined, and the light emitting control device 200 and the light emitting device 500 may share the same object origin defined for each direction shape.

According to the absolute coordinate method as an embodiment of the inventive concept, in the case of transmitting reference coordinates, which are coordinate information of the object origin OO of an object, through a control packet, the reference coordinates may be an absolute object origin OO. For example, it may be assumed that the reference coordinates of a first object are (10, 10), the reference coordinates of a second object are (30, 10), the reference coordinates of a third object are (50, 10), and the reference coordinates of the fourth object are (260, 10). To transmit a value including 260 among the values without problems, it is impossible to use 1 byte (8 bits) with an expression range of 0 to 255, but it is possible to use 2 bytes (16 bits) having an expression range of 0 to 65535 higher than the expression range of 0 to 255. That is, there is a case where the space of coordinate data having 2 bytes is allocated to a packet, but there is no problem when a packet size is sufficient.

According to an embodiment of the inventive concept, the object origin OO may be determined in advance depending on a direction shape or may be set and stored under the control of the light emitting control device 200 (a relative coordinate method). The object origin OO may be changed under the control of the light emitting control device 200. When an object origin is changed, the light emitting device 500 may maintain the synchronization with the light emitting control device 200 by updating the coordinate information depending on the changed standard.

Referring to FIG. 4, the lighting map LIGHTING MAP may include a valid area, in which a direction shape is displayed, and a blank area EA in which the direction shape is not displayed. The valid area may include a direction object or partial objects constituting the direction object. Light emitting devices included in the valid area may emit light in a specific color indicated by the light emitting control device 200. The light emitting device included in the blank area EA may be set to maintain the existing light emitting state, to emit light with predetermined color information (e.g., Black), to stop, omit, or skip a light emitting operation. For example, the blank area EA in the lighting map may be set to 255 (0xFF), which is the maximum expression range of 1 byte. In this case, the light emission color based on RGB code allocation may be black. As the blank area EA is skipped to emit black or not to emit light, the identical or similar environment to the dark background of a performance hall may be created.

According to an embodiment, a control packet transmitted (broadcast) from the light emitting control device 200 may be provided differently for each audience seat zone of the performance hall. Referring to FIG. 4, number 1, number 2, number 3, number 4, and number 5 may be displayed as expression levels, and the control packet may be provided to a light emitting device located in a valid area indicating a direction shape. The control packet may not be provided to a light emitting device located in an invalid area where a number is not displayed.

According to an embodiment of the inventive concept, a lighting map may include a plurality of partial objects. A total of 16 partial objects 1 to 9 and A to G are shown in FIG. 4, but are not limited thereto. In the lighting map, 1 bit may be allocated to each partial object. One of the lighting scenarios of the whole lighting map may be directed by operating only when each bit is active. For example, when the lighting map has 16 partial objects, 2 bytes (=16 bits) may be allocated to the control packet as partial object indication information, and the activation or inactivation of 16 partial shapes may be indicated individually through one control packet by allocating the activation information of each partial object to 16 bits.

Figure 5:
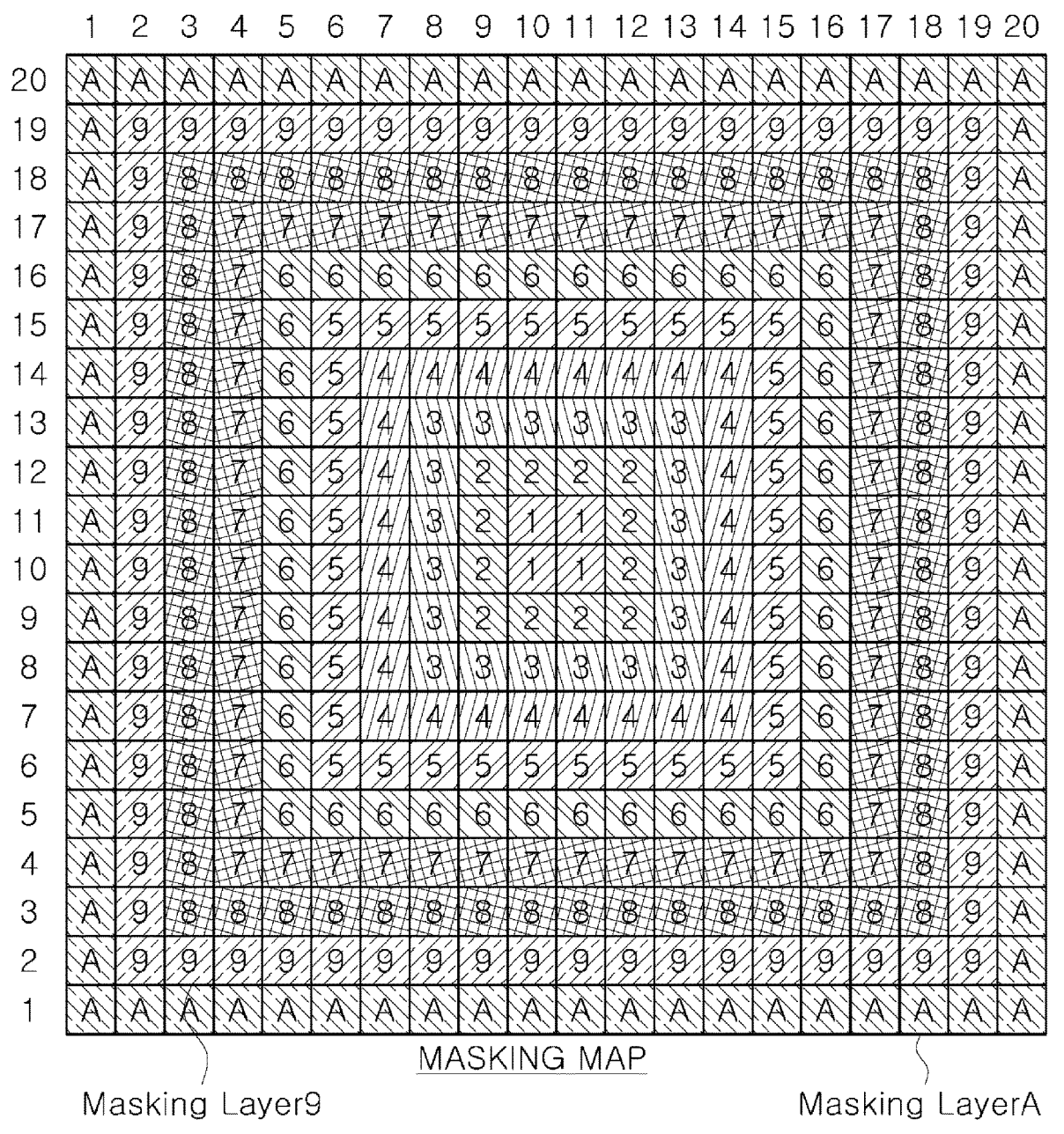

FIG. 5 is a diagram illustrating a masking map MASKING MAP including a plurality of masking layers, according to an embodiment of the inventive concept.

The masking map MASKING MAP is a direction map configured to mask all or part of all possible direction objects capable of being expressed as direction objects. A director of the performance may set and/or control all or part of the lighting map to be covered by using all or part of the masking map.

According to an embodiment of the inventive concept, the masking map may include a plurality of masking layers, and the masking map may be a means capable of dynamically representing a direction object by masking a part of the direction shape. Each masking layer may mask one direction object or a part of the one direction object. In other words, the direction object may be covered by at least one masking layer. The masking map may mask direction objects sequentially over time. Accordingly, light emitting devices in the performance hall may direct dynamic effects such as those of moving images as a direction object.

According to an embodiment, the mask information may be expressed based on a weight to completely hide, partially show, or fully reveal the direction object. For example, when mask information expressed as 8-bit information is expressed as "0b00000000" (i.e., decimal number 0), the direction object may be interpreted as being represented at 0%. When the mask information is expressed as "0b11111111" (i.e., decimal number 255), the direction object may be interpreted as being represented at 100%. When the mask information is expressed as "0b10000000" (i.e., decimal number 128), the direction object may be interpreted as being represented at 50%. Assuming that the default color of the direction object is white, when the direction object is represented at 0%, it may be determined that the direction object is expressed in black; when the direction object is represented at 100%, it may be determined that the direction object is expressed in gray; and when the direction object is represented at 50%, it may be determined that the direction object is expressed in white.

The mask information may be divided into color elements (red (R), green (G), and blue (B)) of each of the light emitting unit 570 in FIG. 3 and may have each weight. For example, as the processor 530 calculates the mask information having weights of red of 100%, green of 50%, and blue of 0%, the light emitting unit 570 may emit light to match a corresponding color.

The expression level of the masking map may be set to maintain the shape of the object origin defined at the center of the object, and expression levels, each of which sequentially has a high order may be set in proportion to a location relationship with the center coordinates.

Similarly to the lighting map, the masking map may be created differently depending on a seat size, a shape of a seat, the number of seats, the kind of a performance (including on-site performances and non-face-to-face online performances), and the type of a performance (concerts, sports events, or the like). The director may create a masking map suitable for each type of the performance through a simulator 201 in FIG. 1. Due to its characteristics, the masking map may have the same size, shape, and arrangement as the lighting map.

Referring to FIG. 5, the masking map may have an object origin. In the inventive concept, it is assumed that the center of the masking map is set as the object origin of the masking map. For example, a shape of the masking map according to an embodiment of FIG. 5 may be a square. The expression level may be differentially determined depending on a seat distance (or is capable of being interpreted as a pixel distance) from the reference coordinates. As the seat distance increases, the expression level may increase.

For example, when the center coordinates of a square shape are reference coordinates, the expression level of reference coordinates is "1", and the expression level of the predetermined seat location (or is capable of being interpreted as a pixel), which is directly adjacent to the reference coordinates and maintains a square shape, is "2". In a similar way, the expression level of a seat location that is directly adjacent to a seat location of expression level "2" and preset to maintain a square shape is "3". Similarly, up to expression level "A" (i.e., masking layer A) may be defined sequentially while maintaining the shape of the immediately preceding expression level "9" (i.e., masking layer 9).

FIG. 6 is a table showing whether the lighting map LIGHTING MAP is activated for each object number, and a bit expression according to the activation in binary and hexadecimal notation. FIG. 7 is a table showing whether the masking map MASKING MAP is activated for each object number, and a bit expression according to the activation in binary and hexadecimal notation.

To create the scene to be directed depending on a scenario in a performance hall, partial objects in a lighting map and a masking layer in a masking map need to be selected. In FIGS. 6 and 7 and drawings below, the following situation is assumed. FIGS. 4 and 5 will be described together.

Partial objects to be activated in the lighting map: 1, 2, 3, 4, 6, 9, C, F Masking layer to be activated in the masking map: 1, 2

Referring to FIG. 6, each of 16 partial objects of the lighting map may be numbered, and activation information (that is, whether it is activated) about whether it is activated may be mapped onto each number. For example, a bit in the case where it is activated may be set to "1", and a bit in the case where it is not activated may be set to "0". However, the opposite or other ways of presenting information may not be excluded.

For example, assuming that object numbers 1 to 4, 6, 9, 12, and 15 for partial objects are activated, and object number 5, 10, 11, 13, 14, and 16 for partial objects are not activated in the lighting map, 2-byte information of binary numbers "11110100" (bin) and "10010010" (bin) may be generated. This may be represented by hexadecimal numbers "F4" (hex) and "92" (hex).

Referring to FIG. 7, similarly to the lighting map, each of 16 masking layers of the masking map may also be numbered, and activation information (that is, whether it is activated) about whether it is activated may be mapped onto each number. For example, assuming that object numbers 1 and 2 for the masking layers are activated and object numbers 3 to 16 for the masking layers are not activated, 2-byte information of binary numbers "11000000" (bin) and "00000000" (bin) may be generated. This may generate hexadecimal numbers "C0" (hex) and "00" (hex). In the above example, when repetition (e.g., all 8 bits are "0") of the same data, such as the second hexadecimal number, occurs, data may be further reduced through an appropriate compression algorithm, thereby improving the transmission speed of control packets.

Figure 8:
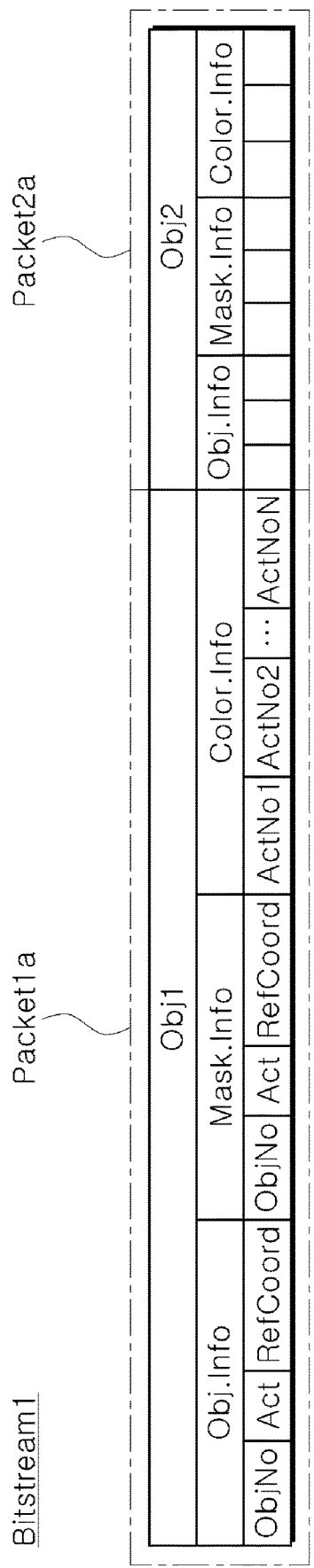
FIG. 8 is a structural diagram of a bitstream, according to an embodiment of the inventive concept.

FIG. 8 is a structural diagram of a bitstream Bitstream1, according to an embodiment of the inventive concept. FIG. 9 is a structure diagram of a control packet Packet1a, according to an embodiment of the inventive concept.

A signal broadcast from the light emitting control device 200 to the light emitting device 500 may include a plurality of control packets. The data representing the direction object may have a file type, an array type, or a bit stream that is a continuation of data in unit of packet, but is not limited thereto. In an embodiment of the inventive concept, for convenience of description, a packet is described as a medium that delivers information of a direction object. It is assumed that the packet delivers information in a form of a bit stream.

Moreover, in an embodiment of the inventive concept, it is illustrated that a data expression unit has 1 byte, but this is only for convenience of description and is not limited thereto. Hereinafter, a data expression range will be described by using a data expression unit of 1 byte.

FIG. 8 is a structural diagram of a bitstream Bitstream1, according to an embodiment of the inventive concept. Referring to FIG. 8, it may be understood that the first bitstream Bitstream1 includes a first control packet Packet1a and a second control packet Packet2a, and further includes at least one control packet thus sequentially received.

The first control packet Packet1a may relate to a first direction object Obj1. In an embodiment, the first control packet Packet1a may include object information Obj. Info, mask information Mask. Info, and color information Color. Info. Similarly, the second control packet Packet2a may relate to a second direction object Obj2 and may include the object information Obj. Info, the mask information Mask. Info, and the color information Color. Info.

In an embodiment of the inventive concept, the object information Obj. Info may be information about a direction object, and may include an object number ObjNo indicating one of direction shapes, an activation information ACT, and reference coordinates RefCoord of the direction shape. The object information Obj. Info may be generated in the light emitting control device 200 in FIG. 1. Some of the object data previously stored in the light emitting device 500 in FIG. 1 may be indicated. The light emitting device 500 may load data corresponding to an instruction of the object information Obj. Info from pre-stored object data based on the object information Obj. Info, and may perform a specific light emitting operation.

Similarly, the object information Obj. Info may be information about a direction object, and may include an object number ObjNo indicating one of direction shapes, an activation information ACT, and reference coordinates RefCoord of the direction shape.

For example, a direction object may have 256 direction shapes capable of being expressed in one byte. For example, because the reference coordinates are usually set to the center coordinates of the direction object, the reference coordinates may be determined as a number not exceeding 16. Because the x-coordinate and the y-coordinate may be expressed with only 8 bits, the reference coordinates may be represented in only one byte. In another example, the reference coordinates represent x-coordinate values between 1 and 20 and y-coordinate values between 1 and 20, and thus may be expressed in two bytes. For example, an expression level may have 256 levels capable of being expressed with one byte. Accordingly, a direction object having 256 direction shapes may be indicated in a 1-byte data range of the object number ObjNo.

FIG. 9 is a structure diagram of a control packet Packet1a, according to an embodiment of the inventive concept. FIGS. 6 and 7 will be described together.

Referring to FIG. 9, as the object information Obj. Info, an object shape may be expressed by being mapped to an object number. For example, the twister (spiral)-shaped object shape may be mapped to object number "1". The decimal number "1" is a hexadecimal number "0x01". The object information may be expressed in one byte.

According to an embodiment of the inventive concept, even when a direction object input to the light emitting device 500 has information called the same name for each zone to effectively express a directing object, shapes or sizes of the information may be different from one another. For example, In a unit object with a size of 20×20, a twister (spiral)-shaped direction object having a size of 20×20 may be an object having number 1 (i.e., object number "1"). In a unit object with a size of 10×10, a twister (spiral)-shaped direction object having a size of 10×10 may be an object having number 1 (i.e., object number "1").

The activation information ACT of the object information Obj. Info may provide information about the activated partial object. For example, referring to FIG. 6 together, when object numbers 1 to 4, 6, 9, 12, and 15 for partial objects are activated, and object number 5, 10, 11, 13, 14, and 16 for partial objects are not activated, hexadecimal numbers "F4" (hex) and "92" (hex) may be expressed, and may be decimal numbers 244 and 146, respectively.

As the object information Obj. Info, the reference coordinates RefCoord may be expressed as an x coordinate value and a y coordinate value. For example, the reference coordinates of a unit object expressed as a 20×20 array may be (10, 10). The decimal number "10" may be a hexadecimal number "0x0A". The reference coordinates expressed as two hexadecimal digits (i.e., x coordinate and y coordinate) may be expressed in two bytes.

As the mask information Mask. Info, a mask shape may be expressed by being mapped to a mask number. For example, a square-shaped masking shape may be mapped to the mask number "2", and the decimal number "2" may be the hexadecimal number 0x02.

The activation information ACT of the mask information Mask. Info may provide information about the activated masking layer. For example, referring to FIG. 7 together, when mask numbers 1 to 2 for the masking layers are activated and object numbers 3 to 16 are not activated, hexadecimal numbers "C0" (hex) and "00" (hex) may be expressed, and may be decimal numbers 192 and 0, respectively.

According to an embodiment of the inventive concept, when the same bit in activation information is repeated, activation information may be generated through other methods that do not activate bits for each bit. For example, when all of object numbers 3 to 16 are mapped to bit "0", information indicating that "up to the second most significant bit is activated" may be provided by providing only data "2" as activation information, instead of generating 2 bytes information of "11000000" (bin) and "00000000" (bin) in the activation information. In a different manner, it is also possible to provide only information of start and end digits of the activation bit such as data "1, 2".

The color information Color. Info may indicate the light emission color of the light emitting device according to the expression level. Because RGB data has 3 channels (R, G, B), three bytes may be required. However, a light emitting device may direct a scene in a performance hall with 256 colors represented in one byte by storing specific RGB values required for light emission in advance.

As a method for emitting light with an expression level having the same color, the valid area of the scene may be limited to the logical value (Bool) "1", and the logical value of the background area may be limited to "0". According to an embodiment, the valid area and the background area may be mutually inverted through a logical inversion operation.

Besides, the valid area and the background area may be inverted by changing the standard operation expression transmitted by using the control packet or through a logic inversion operation (NOT operation).

In an embodiment of the inventive concept, each of the light emitting devices may emit light differently for each expression level. Referring to FIG. 9, a light emitting device corresponding to "Activation 1" corresponding to a partial object may emit light with a pre-stored RGB value (e.g., #FFFF00) corresponding to yellow. A light emitting device corresponding to "Activation 2" may emit light with a pre-stored RGB value corresponding to brown. Likewise, light emitting devices corresponding to 'Activation 3' to 'Activation 16' may respectively emit green, blue, or the like, which is stored in advance. At this time, a light emitting device corresponding to a specified signal as "Don't care" may omit or skip light emission.

Although not explicitly shown in FIG. 9, according to an embodiment of the inventive concept, the same color may be referenced for each different expression level. As weight based on an expression level is allocated, and thus different colors may be expressed for each expression level. In this case, the color information Color. Info may indicate only one color.

According to an embodiment of the inventive concept, because a direction object and a masking layer controls the emission of the object by using the reference coordinates RefCoord, each of objects may be overlaid when the reference coordinates of each object are adjacent to each other. For example, when it is determined that the reference coordinates of objects are adjacent to each other, the previous information of a bitstream is calculated first, and then the subsequent information of the bitstream is sequentially calculated. Accordingly, overlay direction is possible. However, the order of calculations is not limited thereto.

Referring to a packet Packet1*a* in FIG. 9, when individually controlling 400 light emitting devices, there is a need for information having at least 400 bytes. On the other hand, the inventive concept may achieve a direction target by using only at least 26 bytes, thereby reducing data throughput and improving data transmission speed.

Figure 10:
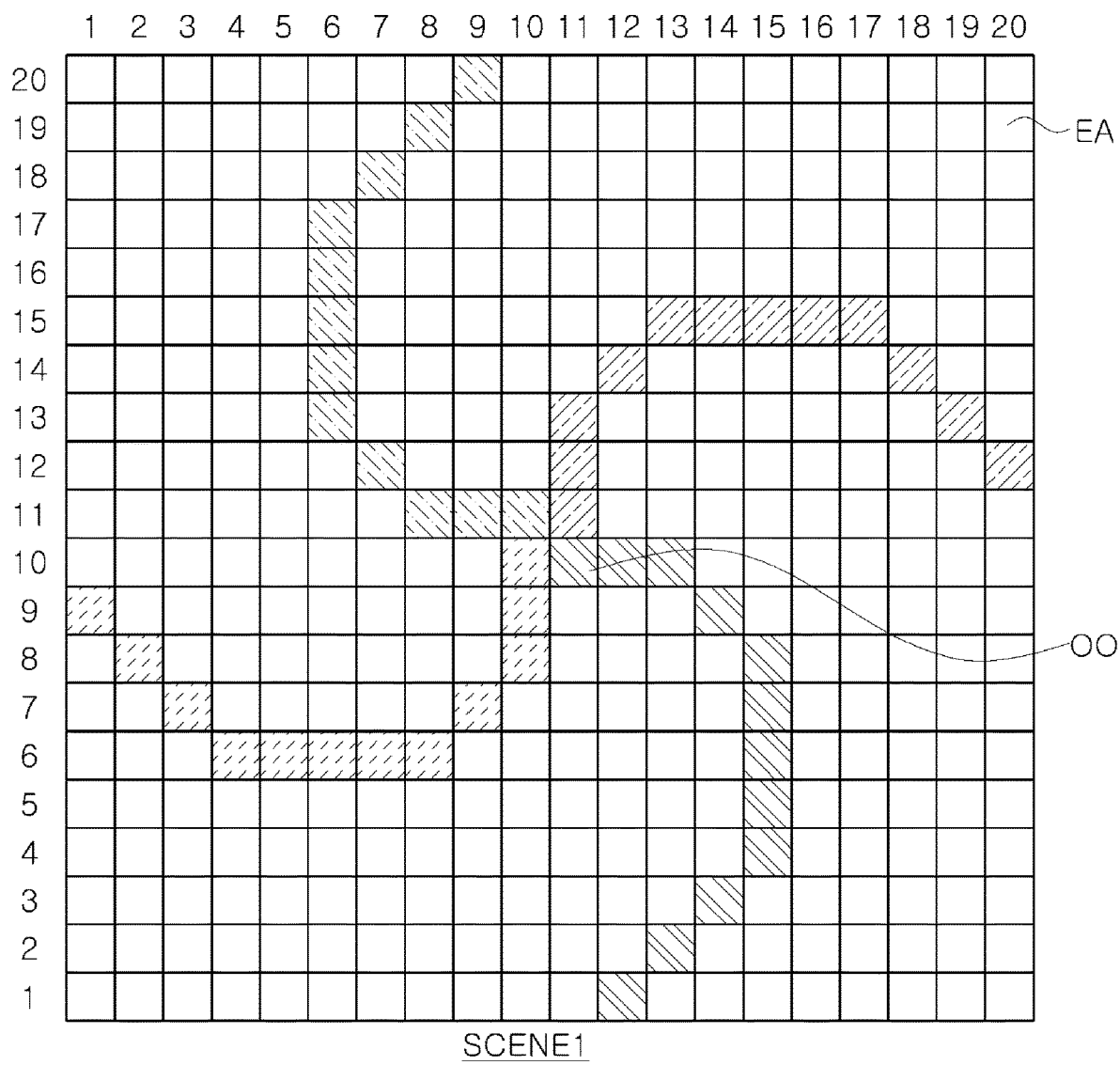
FIG. 10 is a diagram illustrating a first scene representing a direction object based on an object origin, according to an embodiment of the inventive concept.

FIG. 10 is a diagram illustrating a first scene SCENE1 representing a direction object based on the object origin OO, according to an embodiment of the inventive concept.

Referring to FIG. 10, the first scene SCENE1 represents a direction object by using coordinates (10, 10) as the object origin OO. For example, when partial object numbers 1, 2, 3, 4, 6, 9, and C are activated, the remaining partial object numbers are deactivated, and all masking layer numbers are activated, a direction object such as the first scene SCENE1 may be generated.

FIGS. 11 to 15 are diagrams illustrating a lighting effect directing method according to an expression stage, according to an embodiment of the inventive concept.

Referring to FIGS. 11 to 15, A control method, and/or a directing method that causes a dynamic imaging effect such as a moving image on a direction object will be described with reference to FIGS. 8, 9, and 10.

As an element constituting a scene, a valid area, in which a direction shape is displayed, and a background area EA, in which a direction shape is not displayed, may be distinguished from each other. The reference object RO may be set to a location (i.e., the center coordinates of a direction object) of (10, 10).

Figure 11:
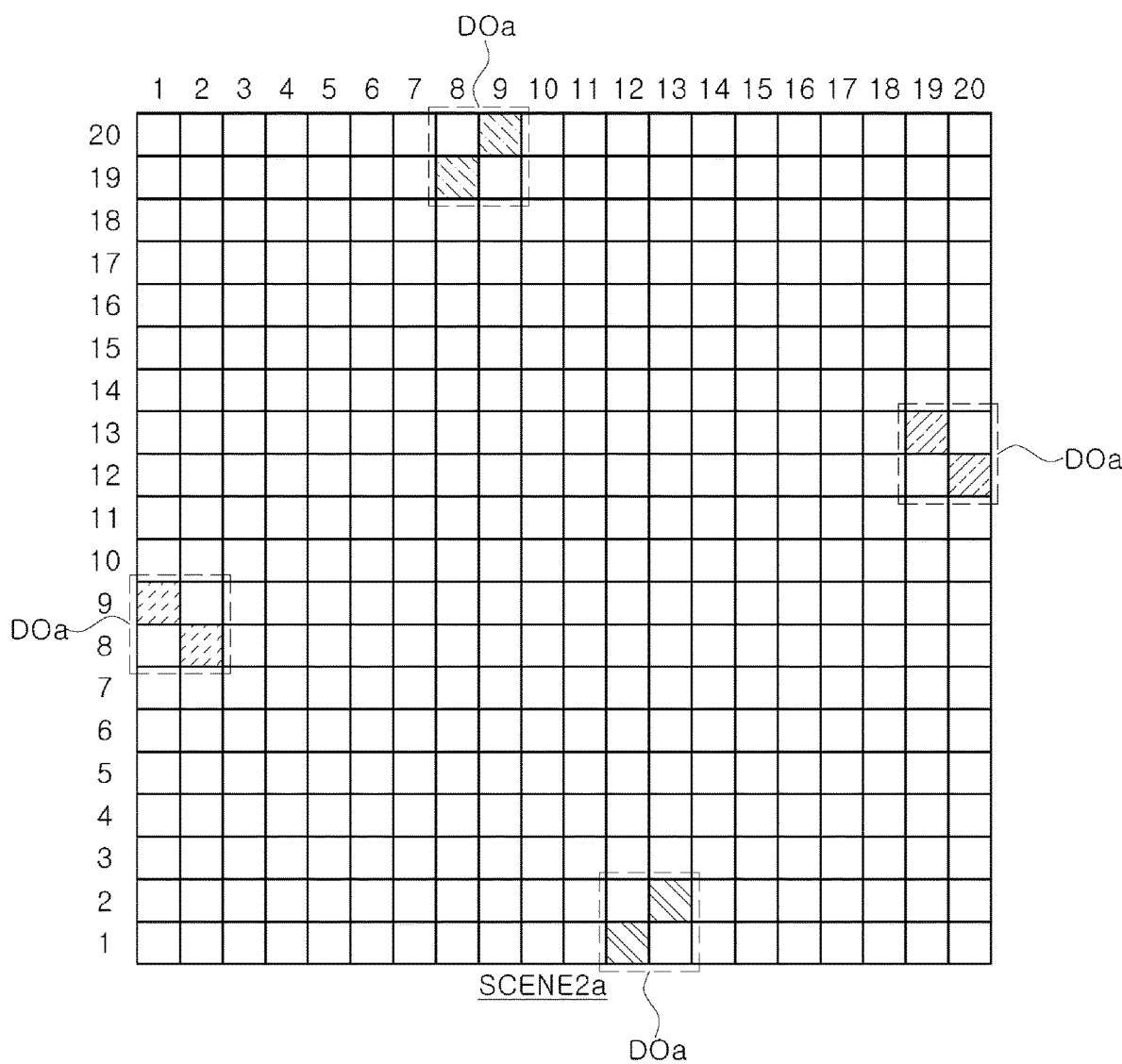
FIGS. 11 to 15 are diagrams illustrating a lighting effect directing method according to an expression stage, according to an embodiment of the inventive concept.

Referring to FIG. 11, to direct a scene SCENE2*a*, as the object information Obj. Info, partial object numbers 1, 2, 3, 4, 6, 9, C, and F are activated, and partial object numbers 5, 7, 8, A, B, D, and E are deactivated. Moreover, as the mask information Mask. Info, masking layer numbers 9 and A are activated, and masking layer numbers 1 to 8 and 11(B) to 15(G) are deactivated.

Activation 1 and activation 6 of the color information Color. Info may represent yellow; activation 2 and activation 9 of the color information Color. Info may represent brown; activation 3 and activation 12(C) of the color information Color. Info may represent green; and, activation 4 and activation 15(F) of the color information Color. Info may represent blue.

According to an embodiment of the inventive concept, a first direction object DOa may be expressed by covering a part of the direction object of the lighting map with a masking layer. The first direction object DOa is a part of the shape of the direction object of FIG. 10.

Figure 12:
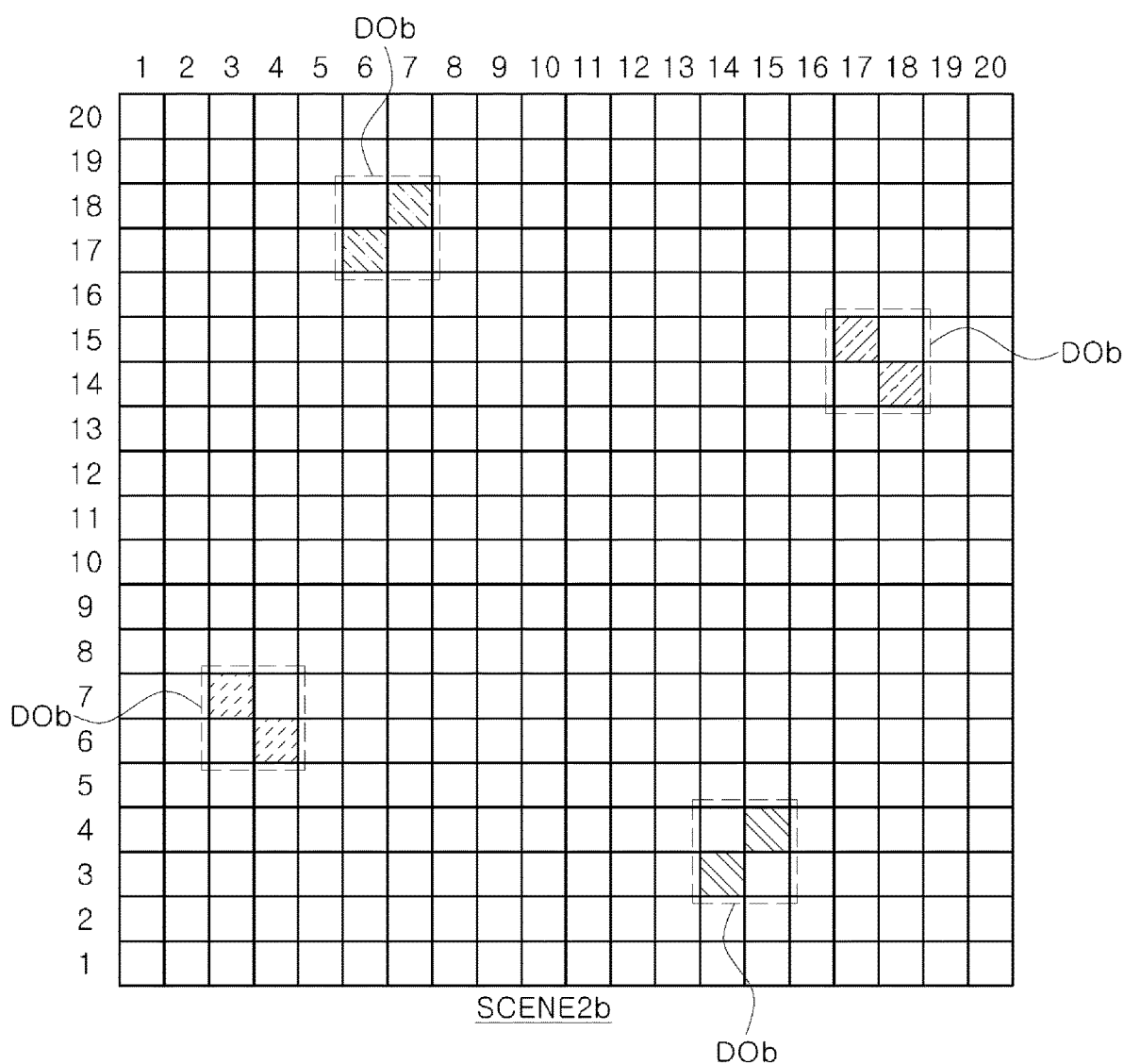

Referring to FIG. 12, to direct a scene SCENE2*b*, as the object information Obj. Info, partial object numbers 1, 2, 3, 4, 6, 9, C, and F are activated, and partial object numbers 5, 7, 8, A, B, D, and E are deactivated. Moreover, as the mask information Mask. Info, masking layer numbers 7 and 8 are activated, and masking layer numbers 1 to 6 and 9 to 15(G) are deactivated.

According to an embodiment of the inventive concept, a second direction object DOb may be expressed by covering a part of the direction object of the lighting map with a masking layer. The second direction object DOb may be a shape, which shares the shape of the direction object of FIG. 10 and moves in a center direction compared to the first direction object DOa.

Figure 13:
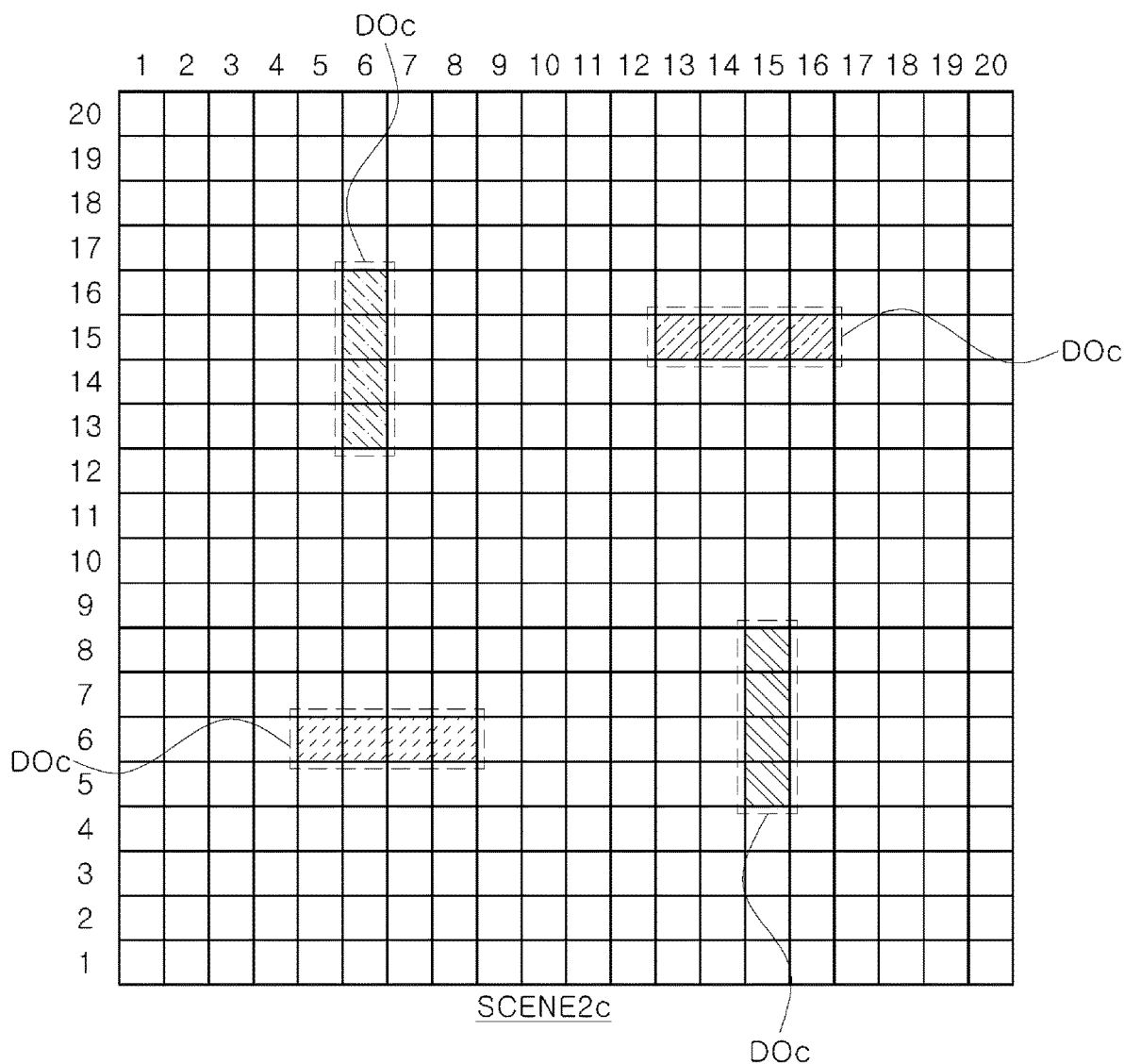

Referring to FIG. 13, to direct a scene SCENE2*c*, as the object information Obj. Info, partial object numbers 1, 2, 3, 4, 6, 9, C, and F are activated, and partial object numbers 5, 7, 8, A, B, D, and E are deactivated. Moreover, as the mask information Mask. Info, masking layer numbers 5 and 6 are activated, and masking layer numbers 1 to 4 and 7 to 15(G) are deactivated.

According to an embodiment of the inventive concept, a third direction object DOc may be expressed by covering a part of the direction object of the lighting map with a masking layer. The third direction object DOc may be a shape, which shares the shape of the direction object of FIG. 10 and moves in the center direction compared to the second direction object DOb.

Figure 14:
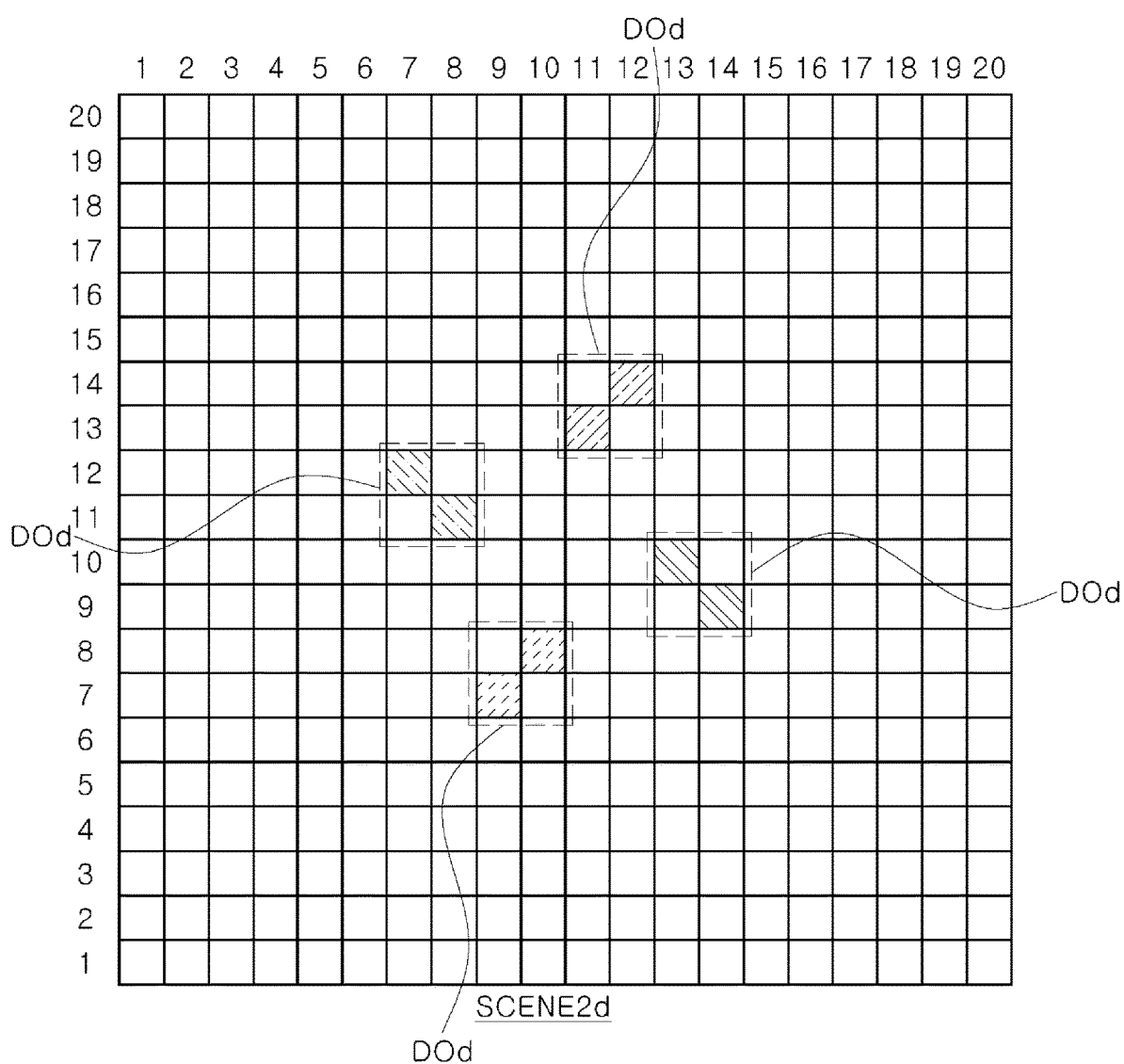

Referring to FIG. 14, to direct a scene SCENE2*d*, as the object information Obj. Info, partial object numbers 1, 2, 3, 4, 6, 9, C, and F are activated, and partial object numbers 5, 7, 8, A, B, D, and E are deactivated. Moreover, as the mask information Mask. Info, masking layer numbers 3 and 4 are activated, and masking layer numbers 1 to 2 and 5 to 15(G) are deactivated.

According to an embodiment of the inventive concept, a fourth direction object DOd may be expressed by covering a part of the direction object of the lighting map with a masking layer. The fourth direction object DOd may be a shape, which shares the shape of the direction object of FIG. 10 and moves in the center direction compared to the third direction object DOc.

Figure 15:
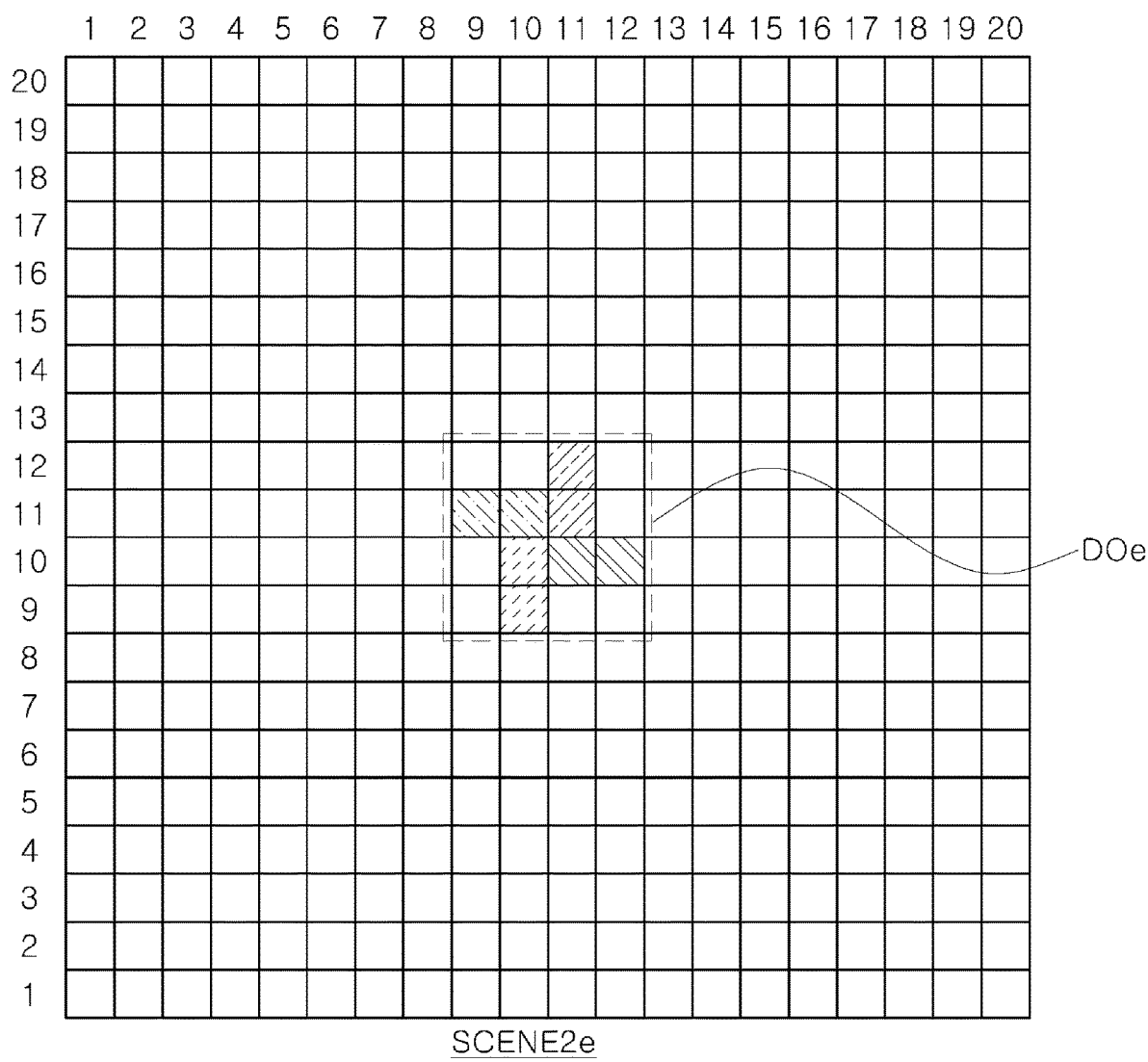

Referring to FIG. 15, to direct a scene SCENE2*e*, as the object information Obj. Info, partial object numbers 1, 2, 3, 4, 6, 9, C, and F are activated, and partial object numbers 5, 7, 8, A, B, D, and E are deactivated. Moreover, as the mask information Mask. Info, masking layer numbers 1 and 2 are activated, and masking layer numbers 1 to 15(G) are deactivated.

According to an embodiment of the inventive concept, a fifth direction object DOe may be expressed by covering a part of the direction object of the lighting map with a masking layer. The fifth direction object Doe may be a shape, which shares the shape of the direction object of FIG. 10 and moves in the center direction compared to the fourth direction object DOd.

Figure 16:
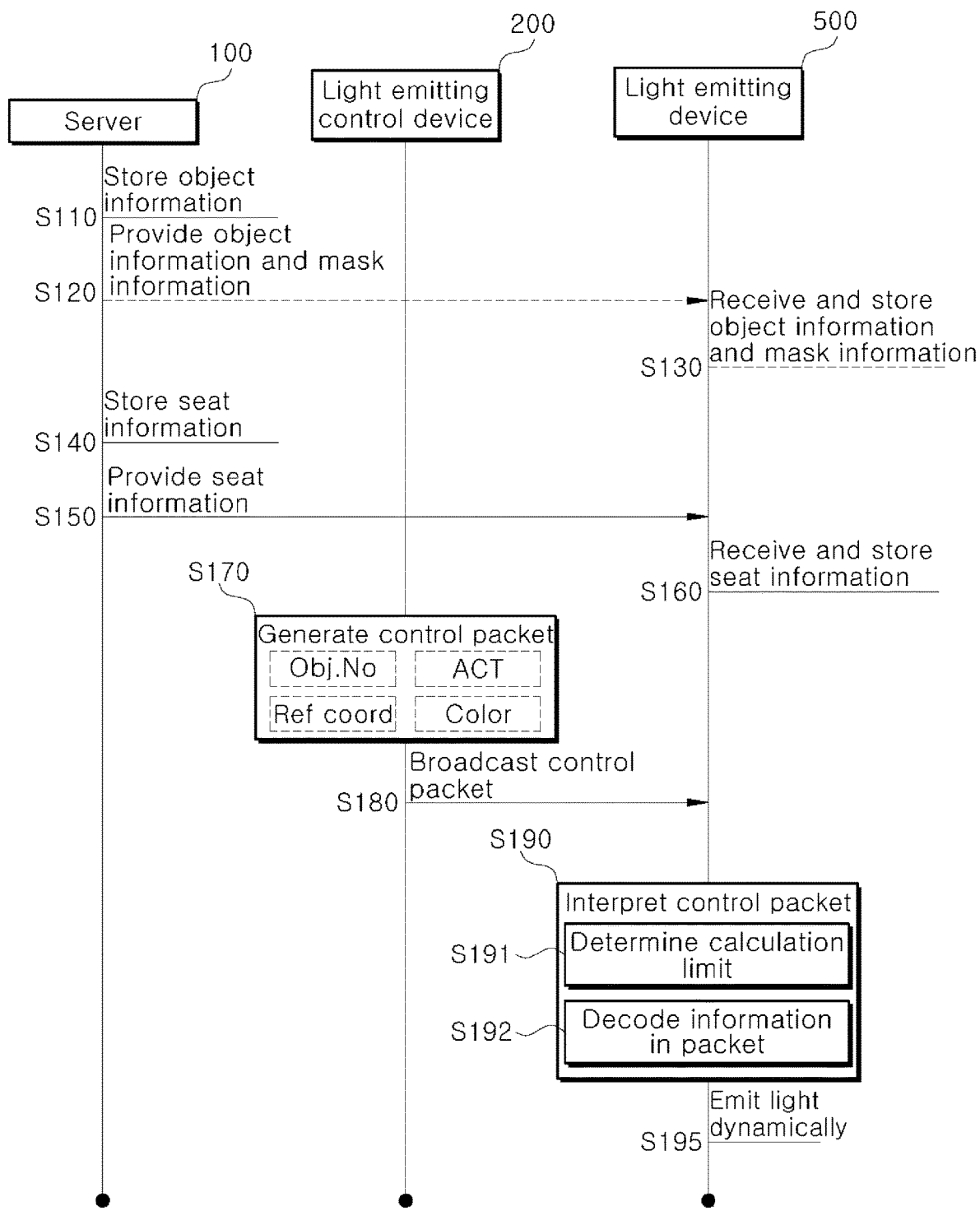
FIG. 16 is a flowchart of a lighting effect directing method, according to an embodiment of the inventive concept.

FIG. 16 is a flowchart of a lighting effect directing method, according to an embodiment of the inventive concept.

Details described in FIGS. 1 to 15 will be omitted within a range in which the details do not conflict with FIG. 16.

In step S110, the server 100 may store direction object data. The direction object data may include object information including the type of a direction shape, mask information including a masking shape, color information, rotation mapping data calculated for each predetermined angle for the rotation of the direction shape, or resizing mapping data calculated in advance to resize the direction shape. The color data may include RGB values provided to emit light in a predetermined color depending on a data expression range.

In step S120, object information and mask information stored in the server 100 may be provided to the light emitting device 500. The object information and the mask information may be transmitted before the start of the performance.

In step S130, the light emitting device 500 may receive the object information and the mask information, and store the object information and the mask information in the memory 550 in FIG. 1. The steps shown in FIG. 6 need not necessarily be interpreted in time series. For example, the object data and the color data may be stored in the production stage of the light emitting device 500, may be stored before or after entering the performance hall and before the start of the performance, may be received immediately before the direction of the object, or may be received during an idle time during a performance. In other words, it is enough to secure the object data and the color data in advance only before the performance or at a point in time when the direction is necessary.

In step S140, the server 100 may store seat information. The seat information may include at least one of location information of a seat indicated on a ticket, identification information of the corresponding seat, and user information. The seat information may be obtained during a ticket checking stage before admission, may be obtained in a process in which a user located at an audience seat enters the seat information into an application installed on a user terminal, or may be obtained by using short-range communication when a specific light emitting device is within a specific distance from a router or beacon that is the type of a short-range communication device, but is not limited thereto.

In step S150, the server 100 may provide the seat information to the light emitting device 500. In step S160, the light emitting device 500 may receive the seat information and may store the seat information in the memory 550.

In the inventive concept, step S140 and step S110 do not mean that step S140 and step S110 are temporally precedent to each other. For example, it may be understood that step S110 to step S130 may be performed after step S140 to step S160.

In step S170, the light emitting control device 200 may generate a control packet including an object number Obj.No as the object information Obj. Info, the activation information ACT, a reference coordinates Ref Coord, an object number Obj.No as the mask information Mask. Info, the activation information ACT, a reference coordinates Ref Coord, and the color information Color. Info. In step S180, the control packet may be broadcast to the light emitting device 500.

In step S190, the light emitting device 500 may interpret the control packet. According to an embodiment, in step S191, the light emitting device 500 may determine a calculation limit. For example, when a distance from the reference coordinates is greater than a predetermined limit distance, the light emitting device 500 may reduce the amount of computation without determining a location relationship between the reference coordinates and the coordinates of the light emitting device 500 itself. According to an embodiment, in step S192, the light emitting device 500 may process a control signal. The control signal may be included in the control packet and may be various signals for controlling the light emitting device 500. For example, the control signal may indicate attribute information of the light emitting device 500 or may include instructions for specifically controlling the light emitting device 500 such as light emission, vibration, and sound generation.

In step S195, the light emitting device 500 may emit light to cause a dynamic effect such as a moving image through control such as selectively emitting light based on a masking layer or omitting light emission.

Figure 17:
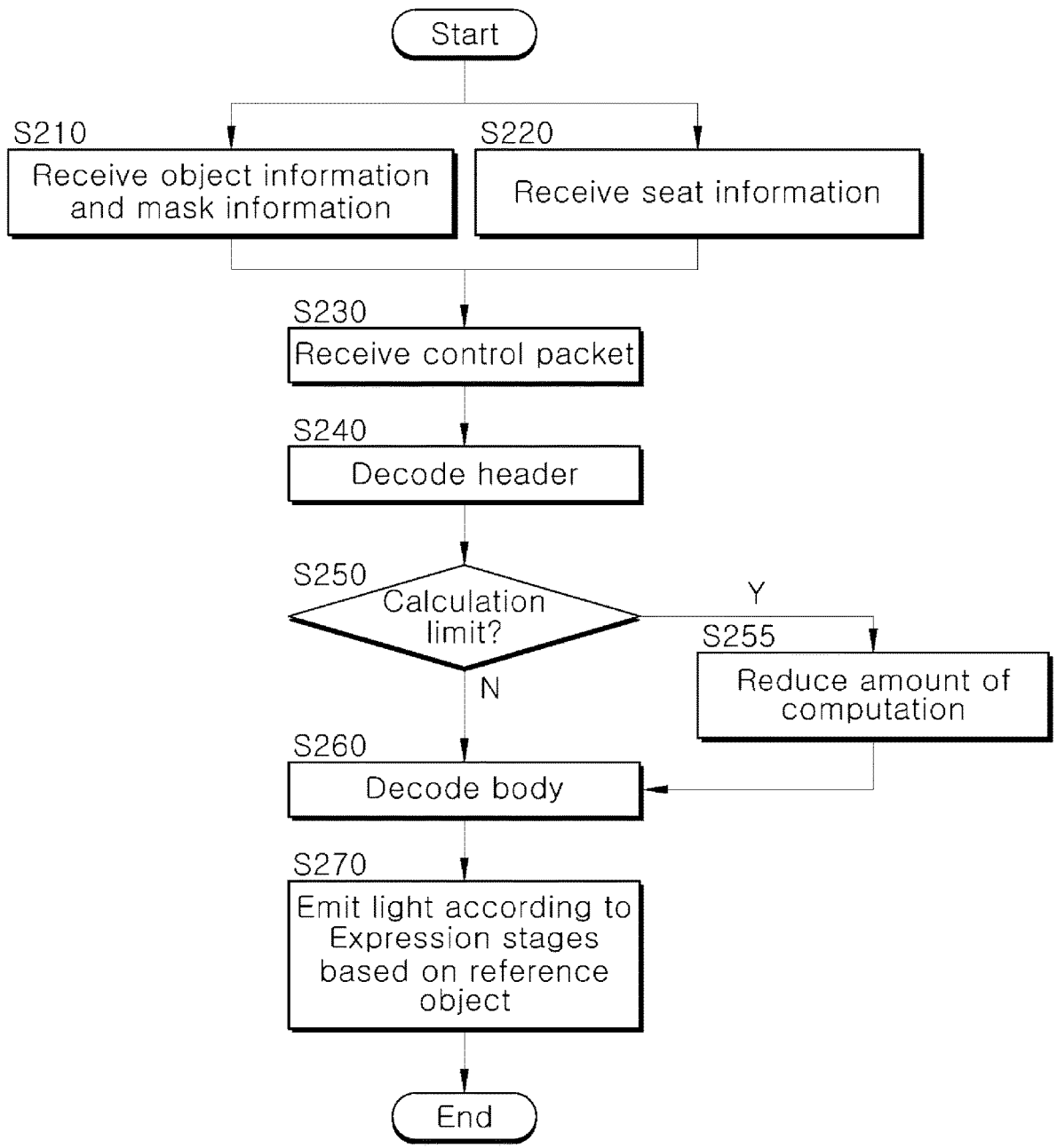
FIG. 17 is a flowchart of a lighting effect directing method of a light emitting device, according to an embodiment of the inventive concept.

FIG. 17 is a flowchart of a lighting effect directing method of the light emitting device 500 in FIG. 1, according to an embodiment of the inventive concept.

In step S210, the light emitting device 500 may receive object information and mask information. The light emitting device 500 may further receive color information together with the object information and the mask information. The object information and the mask information are similar to those described in FIGS. 1 and 6, and thus redundant description will be omitted.

In step S220, the light emitting device 500 may receive seat information. The seat information is similar to that described in FIGS. 1 and 7, and thus redundant description will be omitted. Moreover, step S210 and step S220 may not have a temporal precedence relationship.

In step S230, the light emitting device 500 may receive a control packet. In an embodiment, the control packet may include the object information. In an embodiment, the control packet may include the object information and the color information.

In step S240, the light emitting device 500 may decode the header of the control packet. For example, a header of the control packet may include meta data about a direction object, such as an object number, an object shape, or an object origin.

In step S250, the light emitting device 500 may determine whether to have a calculation limit. According to an embodiment, the light emitting device 500 may determine the calculation limit based on the direction shape or the object origin, and may perform calculations while omitting unnecessary parts of the calculations, thereby improving the calculation speed.

According to an embodiment of the inventive concept, when it is determined based on the direction shape and the object origin that coordinates (i.e., device coordinates) of the light emitting device 500 are farther than the predetermined limit distance, the light emitting device 500 may omit the determination of the location relationship between the object origin and device coordinates and may reduce the amount of computation (step S255).

When the light emitting device 500 receives only the object information and the mask information, the predetermined light emission color of the light emitting device 500 may be fixed. Nevertheless, because the light emitting devices 500 may perform weighted light emission according to the expression level, the color data may not be received. Alternatively, despite the absence of color information, a direction object may be directed dynamically.

In step S260, the light emitting device 500 may decode the body of the control packet. The body of the control packet may be a substantial area of data excluding the header, and may mean the substance of data, not meta data. For example, the body of the control packet may include color information. The light emitting device 500 may identify color information for emitting light.

In step S270, the light emitting device 500 may emit light according to expression stages based on an object origin. In an embodiment, the light emitting device 500 may determine the expression level depending on a relationship with a location from reference coordinates by decoding the body, may interpret color information corresponding to the direction shape and expression level, and may emit light in a corresponding color. In addition, the light emitting device 500 may cause a dynamic effect of the direction object by selectively covering the direction object with a masking layer based on the object information and the mask information.

Figure 18:
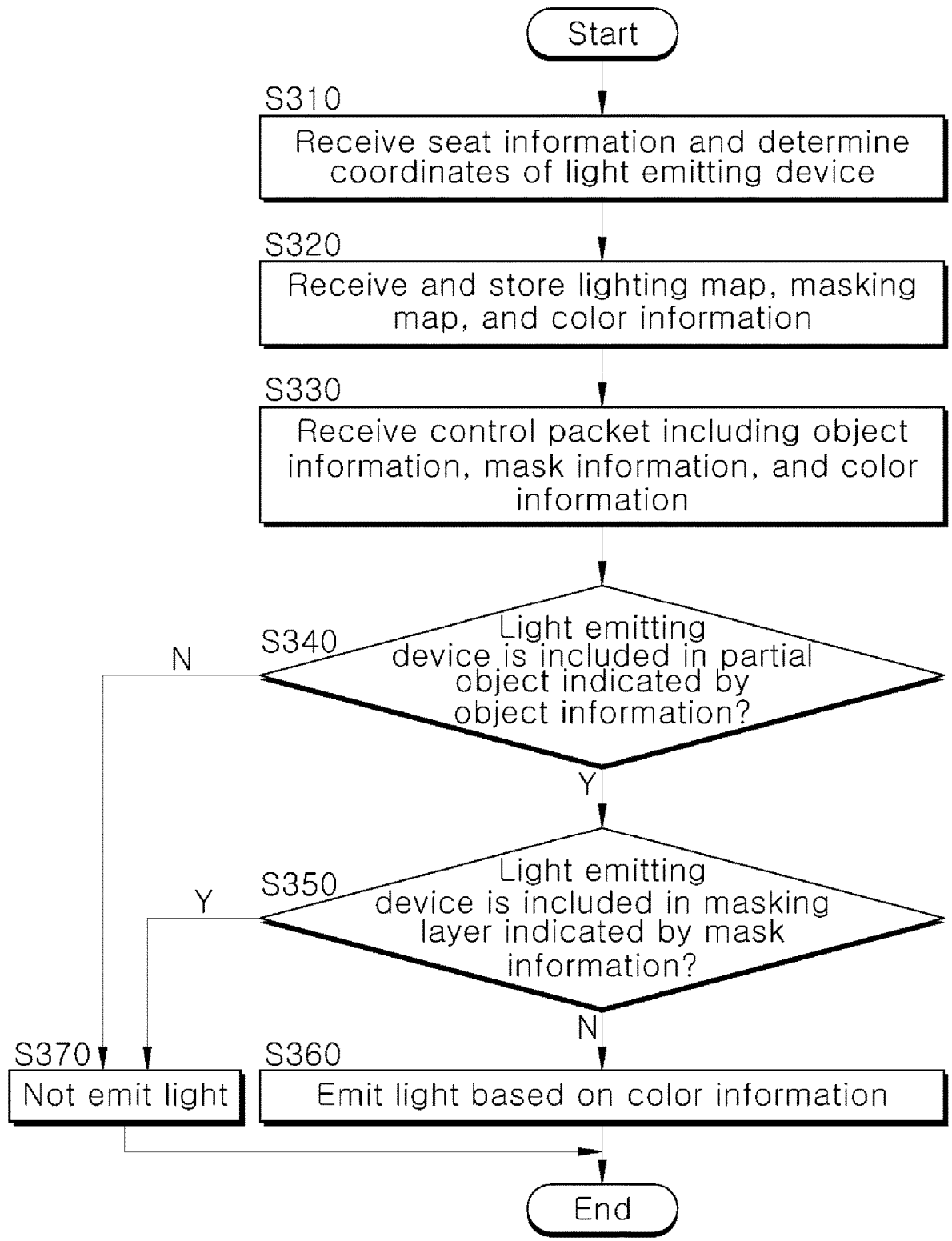
FIG. 18 is a flowchart of a lighting effect directing method of a light emitting device, according to an embodiment of the inventive concept.

FIG. 18 is a flowchart of a lighting effect directing method of the light emitting device 500 in FIG. 1, according to an embodiment of the inventive concept.

In step S310, the light emitting device 500 may receive seat information and may determine coordinates of a light emitting device. For example, the seat information may be provided from a server. For example, the seat information may be directly entered from a smart device possessed by an audience, or may be automatically provided from a performance hall depending on a location relationship of the corresponding seat.

In step S320, the light emitting device 500 may receive and store a lighting map, a masking map, and color information. There is no restriction on temporal precedence of step S310 and step S320.

In step S330, a control packet including object information, mask information, and color information may be received. For example, the control packet may be received from a light emitting control device. For example, the control packet may be received through a master device or a transmitter.

In step S340, the light emitting device 500 may determine whether the light emitting device 500 itself is located in a partial object indicated by the object information, or whether the light emitting device 500 is included in a range of the partial object. When the light emitting device 500 itself is not included in the partial object range corresponding to the indicated object information, the light emitting device 500 may not emit light (step S370).

When the light emitting device 500 itself is included in the range of a partial object corresponding to the indicated object information, in step S350, the light emitting device 500 may determine whether the light emitting device 500 itself is located in the masking layer indicated by the mask information or whether the light emitting device 500 is included in the range of the masking layer indicated by the mask information. When the light emitting device 500 itself is included in the masking layer corresponding to the indicated mask information, the light emitting device 500 may not emit light (step S370).

In the inventive concept, for convenience of description, a case in which the light emitting device does not emit light is described as one of various embodiments, but the technical spirit of the inventive concept is not limited thereto. According to an embodiment of the inventive concept, when the light emitting device 500 is included only in a partial object, the light emitting device 500 may emit light in a first color. When the light emitting device 500 is included in both the partial object and the masking layer, the light emitting device 500 may emit light in a second color. For example, according to an embodiment of the inventive concept, when the light emitting device 500 is not included in a partial object, or the light emitting device 500 is included in a partial object and is doubly included in a masking layer at the same time, the light emitting device 500 may emit light in a preset color (e.g., black). Here, the preset color may correspond to a background color of a seat. However, it will be understood that various colors such as white may be preset depending on a direction scene.

In step S360, when the light emitting device 500 is not included in a masking layer indicated by the mask information, light may be emitted based on the indicated color information.

According to an embodiment of the inventive concept, the lighting effect directing method of a direction object based on reference coordinates does not determine, in advance, whether a light emitting device located at a specific seat may emit light. The light emitting devices may receive and decode a control packet for determining whether to emit light, may identify reference coordinates and object information, may determine a location relationship between own coordinates of the light emitting devices and the reference coordinates, and may determine whether light is emitted, based on the received object information and the received mask information.

According to an embodiment of the inventive concept, the lighting effect directing method of a direction object based on reference coordinates may group specific light emitting devices separately or may display a direction object with various direction shapes to audience seats without the need to store group information, thereby implementing dramatic and dynamic performance directions. Moreover, because direction shapes such as complex shapes and complex outlines are capable of being displayed with a small amount of data processing, performance hall may be controlled effectively by reducing the display latency of the direction object caused by the processing time of the light emitting device 500.

Figure 19:
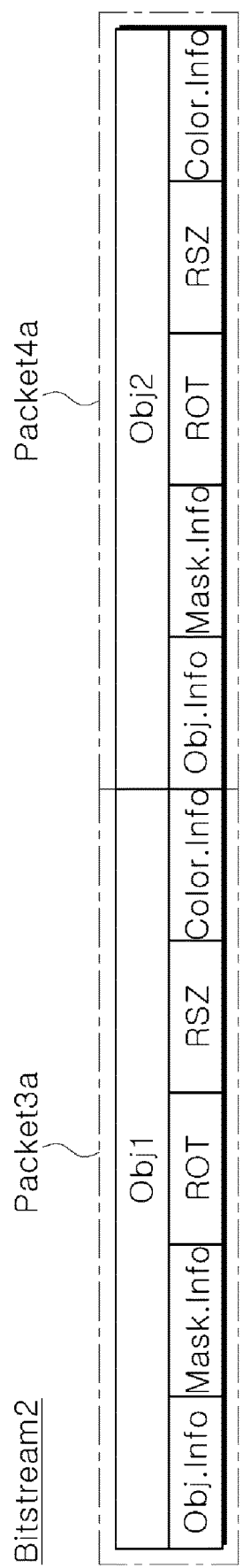
FIG. 19 is a structural diagram of a bitstream, according to an embodiment of the inventive concept.

FIG. 19 is a structural diagram of a bitstream Bitstream2, according to an embodiment of the inventive concept. FIG. 20 is a structural diagram of a control packet Packet3*a*, according to an embodiment of the inventive concept. Descriptions of the bitstream structure diagram or the control packet structures diagrams of FIGS. 19 and 20 the same as descriptions of the structure diagrams disclosed in FIGS. 8 and 9 will be omitted to avoid redundancy.

Referring to FIG. 19, a first control packet Packet3*a* may include the object information Obj. Info, the mask information Mask. Info, rotation information ROT, resizing information RSZ, and the color information Color. Info. Similarly, a second control packet Packet4*a* may relate to a second direction object Obj2 and may include the object information Obj. Info, the mask information Mask. Info, the rotation information ROT, the resizing information RSZ, and the color information Color. Info.

The rotation information ROT refers to information for expressing a direction object by rotating the direction object. In an embodiment, the rotation information ROT may include a rotation conversion calculation value based on linear algebra. The light emitting device 500 may rotate the direction object based on the rotation information ROT. In an embodiment, in addition to a rotation that takes a direction (i.e., a normal direction) perpendicular to a plane as a rotation axis, the rotation information ROT may represent another three-dimensional rotation. For example, the rotation information ROT may be used to perform various mathematical operation methods for expressing a pitch, roll, and yaw of the direction object. The light emitting device 500 may rotate forward and backward and/or up and down the direction object.

The resizing information RSZ may convert the size of the direction object. In an embodiment, the resizing information RSZ may change the predetermined size (e.g., 20×20) of the direction object at a predetermined specific rate (i.e., horizontal and vertical lengths are different from each other) or a specific magnification (i.e., horizontal and vertical lengths are the same as each other).

In an embodiment, a precedence relationship or a priority relationship between the rotation information ROT and the resizing information RSZ may not be determined.

Referring to FIG. 20, the control packet Packet3*a* may include the rotation information ROT and/or the resizing information RSZ as a part of the object information Obj. Info. In this case, magnification information and rotation information may have an expression range of 256 types (1 byte) having a value of 0 to 255.

In another embodiment, similarly to FIG. 8, the control packet Packet3*a* may include the rotation information ROT and/or the resizing information RSZ as information separate from the object information Obj. Info. In the inventive concept, it is determined that one byte is allocated to a magnification (resizing) and a rotation value, but is not limited thereto. When a larger data unit is allocated to rotation information and resizing information, more detailed magnification and rotation control will be possible.

Even when the rotation information ROT, and/or the resizing information RSZ are included in the third packet Packet3*a*, the total size of data in 1 byte unit is 28. It is only increased by 2 compared to a case where the rotation information ROT and/or the resizing information RSZ are not present, and thus more sophisticated scene production is possible.

FIG. 21 is a rotation mapping table indicating the rotation information ROT, according to an embodiment of the inventive concept. FIG. 22 is a scene SCENE3 for a rotated direction object, according to an embodiment of the inventive concept.

Referring to FIG. 21, the rotation mapping table including the rotation information ROT may have 256 expression ranges (1 byte), and may indicate each data value is different by a specific angle. For example, when the rotation information ROT indicates the decimal number "0", the light emitting device 500 may use the rotation mapping table as a lookup table, and may emit light of a direction object at an original angle depending on an angle corresponding to zero, and a sin value of zero corresponding thereto. Similarly, when the rotation information ROT indicates the decimal number "20", the light emitting device 500 may identify the angle "30" and the sin value "0.5" corresponding to the decimal number "20" based on the second mapping table, and may rotate the direction object by 30 degrees.

The rotation mapping table is the result of dividing 360 degrees into 240 equal parts by using values between 0 and 239, rather than dividing 360 degrees into 256 equal parts by using values between 0 and 255, which are capable of being expressed in 1 byte (8 bits). As a result, it indicates 1.5 degrees per object rotation indication value of 1, which is easily converted into a cosine (cos) value. Because sine and cosine are values with a phase difference of 90 deg, even when only one pre-calculated result value table is stored, the one pre-calculated result value table may be applied to sine and cosine calculations. Accordingly, a memory may be saved by reducing storage capacity.

In a case of a resolution of about 1.5 deg per weight 1 of the object rotation value, the calculated value of sine and cosine has little effect on rotation calculations even when the calculated value handles only up to the third decimal place.

Referring to FIG. 22, scene 3 SCENE3, which is the result of a rotation of a direction object, is shown.

In the same way as the rotation of an image, the rotation of a direction object may be achieved by multiplying coordinates of an object by the cosine or sine value corresponding to an angle. However, most of the processor 530 of the light emitting device 500 does not include an FPU or a DSP, and thus the calculation speed of real numbers is not high. According to an embodiment of the inventive concept, the calculation speed may be improved by using the result of converting the sine and cosine operation result corresponding to each angle of the predetermined value into an integer according to the mapping table, without directly calculating trigonometric functions to improve the calculation speed of the light emitting device 500.

FIG. 23 is a resizing mapping table including the resizing information RSZ, according to an embodiment of the inventive concept. FIG. 24 is a scene SCENE4 for a resized direction object, according to an embodiment of the inventive concept.

Referring to FIG. 23, the resizing mapping table including the resizing information RSZ may have 256 expression ranges (1 byte), and may indicate a constant magnification for each data value. For example, when the resizing information RSZ indicates decimal number "127", the light emitting device 500 may use the resizing mapping table as a lookup table, and may emit the light of a direction object with "original size" that is a magnification corresponding to 127. Similarly, when the resizing information RSZ indicates decimal number "132", the light emitting device 500 may identify the magnification of "1.5 times" corresponding to the decimal number "132" based on the resizing mapping table, and may emit the light 1.5 times as large as the original size of the direction object.

Object magnification may use a data processing unit such as float and double, but may use a resizing mapping table promised in advance to save packet data.

FIG. 23 presupposes common magnification for horizontal and vertical lines, but it is not limited thereto. For example, horizontal and vertical magnifications are applied differently, and thus both the horizontal object magnification indication value and the vertical object magnification indication value may be included in a packet.

In an embodiment of the inventive concept, a negative magnification may be included in the resizing mapping table. The negative magnification may be predefined as reversing up and down or left and right.

Referring to FIG. 24, a fourth scene SCENE4 may be a heart-shaped object, and the size thereof may be resized. In an embodiment, the light emitting device 500 may further receive the resizing information RSZ, and may direct the result of extending the direction object depending on the magnification indicated by the resizing information RSZ. In particular, in the scene SCENE4, the light emitting device 500 may not need to separately control the heart shape that fills a direction unit. A variety of direction objects may be represented by using only object information including reference coordinates and expression levels, and the resizing information RSZ. As such, the lighting effect directing method according to an embodiment of the inventive concept may achieve the direction having a high degree of freedom by directing the direction position, size, or rotation of an object during a performance direction in a performance hall.

Although not illustrated in drawings, a direction object may be a letter or font as well as an image. A direction object in a form of an image may be expanded and shrunk relatively freely. When a letter or a font is arbitrarily expanded and shrunk, a size thereof may be crushed, and it is difficult to perceive the letter or the font as a language. According to an embodiment of the inventive concept, the predetermined shape of a direction object may be provided depending on a specific size, magnification, and ratio of the letter instead of shrinking or enlarging the letter. The provided direction object may be stored in advance in the light emitting device 500 in FIG. 1.

According to an embodiment of the inventive concept, because directing direction objects based on reference coordinates, a lighting effect directing method may be represented by overlapping a plurality of direction objects, thereby causing a layer effect. Besides, as compared to individually controlling a light emitting device light emitting device during a performance direction in the performance hall, the lighting effect directing method according to an embodiment of the inventive concept may efficiently use a frequency band and may reduce a delay time required to process a control signal including a control packet. Also, unlike individually controlling each of a plurality of light emitting devices, a lighting effect directing method according to an embodiment of the inventive concept may reduce the data size of a control signal transmitted wirelessly, thereby securing a fast response speed. Accordingly, the lighting effect directing method according to an embodiment of the inventive concept may simultaneously control a larger number of light emitting devices in real time compared to conventional technologies.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Various embodiments according to an embodiment of the inventive concept may be implemented as software including one or more instructions stored in a storage medium (e.g., a memory) readable by a machine. For example, a processor (e.g., the processor 230 or 530) of the machine may call at least one instruction among the stored one or more instructions from a storage medium and then may execute the at least one instruction. This may enable the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily. For example, the 'non-transitory storage medium' may include a buffer in which data is temporarily stored.

According to an embodiment, a method according to various embodiments disclosed in the inventive concept may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product (e.g., a downloadable app) may be at least temporarily stored in the machine-readable storage medium such as the memory of a manufacturer's server, an application store's server, or a relay server or may be generated temporarily. Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, a lighting effect directing method may selectively control the emission of a plurality of light emitting devices based on a masking layer, thereby inducing dynamic imaging effects such as moving images in a direction object.

Moreover, the lighting effect directing method according to an embodiment of the inventive concept may achieve the direction having a high degree of freedom by directing the direction position, size, or rotation of an object during a performance direction in a performance hall.

Furthermore, the lighting effect directing method according to an embodiment of the inventive concept may express direction objects based on an object origin, and thus may cause a layer effect by overlapping the plurality of direction objects.

Besides, as compared to individually controlling a light emitting device light emitting device during a performance direction in the performance hall, the lighting effect directing method according to an embodiment of the inventive concept may efficiently use a frequency band and may reduce a delay time required to process a control signal including a control packet.

Also, unlike individually controlling each of a plurality of light emitting devices, a lighting effect directing method according to an embodiment of the inventive concept may reduce the data size of a control signal transmitted wirelessly, thereby securing a fast response speed. Accordingly, the lighting effect directing method according to an embodiment of the inventive concept may simultaneously control a larger number of light emitting devices in real time compared to conventional technologies.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A lighting effect directing method performed by a light emitting device of a lighting control system, the method comprising:
   determining first coordinates of the light emitting device at a seat based on seat information thus received;
   receiving and storing a lighting map predefined to express a direction shape and a masking map predefined to cover at least part of the direction shape;
   receiving a control packet, which includes object information indicating at least one of a plurality of partial objects included in the lighting map, mask information indicating at least one of a plurality of masking layers included in the masking map, and color information indicating a light emission color, and which is broadcast; and
   emitting light corresponding to the light emission color when it is determined based on the object information and the mask information that the light emitting device is included in the indicated partial object, and dynamically expressing the direction shape by omitting light emission when it is determined that the light emitting device is also doubly included in the indicated masking layer.

2. The method of claim 1, wherein the object information includes an object number indicating one of a plurality of direction scenes, activation information of the plurality of partial objects included in a lighting map corresponding to an indicated object number, and coordinate information of a first reference origin of the lighting map.

3. The method of claim 2, wherein an object origin of the lighting map is a center of the direction shape, and
   wherein the first coordinates are relatively determined based on the first reference origin.

4. The method of claim 1, wherein the mask information includes a mask number indicating one of a plurality of mask shapes, activation information of the plurality of masking layers included in a masking map corresponding to an indicated mask number, and coordinate information of a second reference origin of the masking map.

5. The method of claim 1, further comprising:
   determining a first location relationship between a first reference origin of the lighting map and the first coordinates, based on the object information; and
   determining a second location relationship between a second reference origin of the masking map and the first coordinates, based on the mask information.

6. The method of claim 5, wherein the determining of the second location relationship includes:
   determining the at least one expression level based on a distance between the second reference origin and the first coordinates.

7. The method of claim 1, wherein the light emitting device is provided with a first table in which a calculation value required for rotation conversion is mapped for each angle, and
   wherein the control packet further includes rotation information indicating rotation of the direction shape.

8. The method of claim 1, wherein the light emitting device is provided with a second table in which a calculation value required for the direction shape is mapped for each magnification, and
   wherein the control packet further includes second indication information indicating a size change of the direction shape.

9. A nonvolatile computer-readable recording medium which is combined with a computer and records a computer program for operating the computer to perform a lighting effect directing method according to claim 1.

10. A lighting effect directing method of a lighting control system including a lighting emitting control device and a light emitting device, the method comprising:
    determining, by the light emitting device, coordinates of the light emitting device at a seat based on seat information thus received;
    receiving and storing, by the light emitting device, a lighting map predefined to express a direction shape and a masking map predefined to cover at least part of the direction shape;
    broadcasting, by the light emitting control device, a control packet including object information indicating at least one of a plurality of partial objects included in the lighting map, mask information indicating at least one of a plurality of masking layers included in the masking map, and color information indicating a light emission color;
    receiving and decoding, by the light emitting device, the control packet;
    determining, by the light emitting device, whether the light emitting device is included in at least one of the partial object and the masking layer, based on the object information and the mask information; and
    emitting light in a first color when the light emitting device is included in only the partial object, and emitting light in a second color when the light emitting device is included in both the partial object and the masking layer.

11. A light emitting device of a lighting control system, the method comprising:
    a communication unit configured to communicate with an external device;
    a processor configured to:
    determine first coordinates of the light emitting device at a seat based on seat information thus received;
    receive and store a lighting map predefined to express a direction shape and a masking map predefined to cover at least part of the direction shape;
    receive a control packet, which includes object information indicating at least one of a plurality of partial objects included in the lighting map, mask information indicating at least one of a plurality of masking layers included in the masking map, and color information indicating a light emission color, and which is broadcast; and
    emit light corresponding to the light emission color when it is determined based on the object information and the mask information that the light emitting device is included in the indicated partial object, and to dynamically express the direction shape by omitting light emission when it is determined that the light emitting device is also doubly included in the indicated masking layer;

a memory configured to store pieces of data and instructions for an operation of the light emitting device; and a light emitting unit including one or more light source elements.

12. The light emitting device of claim 11, wherein the object information includes an object number indicating one of a plurality of direction scenes, activation information of the plurality of partial objects included in a lighting map corresponding to indicated object number, and coordinate information of a first reference origin of the lighting map, wherein an object origin of the lighting map is a center of the direction shape, and wherein the first coordinates are relatively determined based on the first reference origin.

13. The light emitting device of claim 11, wherein the processor is further configured to:

determine a first location relationship between a first reference origin of the lighting map and the first coordinates, based on the object information; and determine a second location relationship between a second reference origin of the masking map and the first coordinates, based on the mask information, and wherein, when the processor determines the second location relationship, the processor determines the at least one expression level based on a distance between the second reference origin and the first coordinates.

14. The light emitting device of claim 11, wherein the light emitting device includes a first table in which a calculation value required for rotation conversion is mapped for each angle, and wherein the control packet further includes rotation information indicating rotation of the direction shape.

15. The light emitting device of claim 11, wherein the light emitting device includes a second table in which a calculation value required for the direction shape is mapped for each magnification, and wherein the control packet further includes second indication information indicating a size change of the direction shape.

* * * * *